(12) United States Patent
Mizuguchi et al.

(10) Patent No.: US 9,361,367 B2
(45) Date of Patent: *Jun. 7, 2016

(54) DATA CLASSIFIER SYSTEM, DATA CLASSIFIER METHOD AND DATA CLASSIFIER PROGRAM

(75) Inventors: Hironori Mizuguchi, Tokyo (JP); Kenji Tateishi, Tokyo (JP); Itaru Hosomi, Tokyo (JP); Dai Kusui, Tokyo (JP)

(73) Assignee: NEC CORPORATION, Tokyo (JP)

(*) Notice: Subject to any disclaimer, the term of this patent is extended or adjusted under 35 U.S.C. 154(b) by 85 days.

This patent is subject to a terminal disclaimer.

(21) Appl. No.: 13/056,031

(22) PCT Filed: Jul. 29, 2009

(86) PCT No.: PCT/JP2009/003602
§ 371 (c)(1),
(2), (4) Date: Jan. 26, 2011

(87) PCT Pub. No.: WO2010/013473
PCT Pub. Date: Feb. 4, 2010

(65) Prior Publication Data
US 2011/0179037 A1    Jul. 21, 2011

(30) Foreign Application Priority Data

Jul. 30, 2008  (JP) ................ P2008-195896

(51) Int. Cl.
*G06F 7/00*  (2006.01)
*G06F 17/30*  (2006.01)

(52) U.S. Cl.
CPC .... *G06F 17/30705* (2013.01); *G06F 17/30707* (2013.01)

(58) Field of Classification Search
USPC .......................... 707/740, 797, 956
See application file for complete search history.

(56) References Cited

U.S. PATENT DOCUMENTS 5,251,144 A * 10/1993 Ramamurthi ................. 700/177
5,325,445 A *  6/1994 Herbert ........................ 382/225
(Continued)

FOREIGN PATENT DOCUMENTS

JP     5-73615 A    3/1993
JP     H0981585 A   3/1997
(Continued)

OTHER PUBLICATIONS

Dakka et al., "Automatic Construction of 1-26 Multifaceted Browsing Interfaces, Proc. of CIKM'05, Oct. 31-Nov. 5, 2005, Bremen, Germany. Copyright 2005 ACM, pp. 768-775".*

(Continued)

*Primary Examiner* — Daniel Kuddus

(57) ABSTRACT

A data classifier system of the present invention selects a plurality of classifications correlated to data groups so as to output classification axes based on hierarchical classifications and data groups. The data classifier system includes a basic category accumulation means, a classification axis candidate creation means and a priority calculation means. The basic category accumulation means accumulates classifications serving as basic categories used for selecting desired classifications in advance. The classification axis candidate creation means creates classification axis candidates based on combinations of classifications each correlated to at least one data among descendant classifications of each basic category. The priority calculation means calculates priorities with respect to the classification axis candidates created by the classification axis candidate creation means based on hierarchical distances of classifications in the classified hierarchy.

29 Claims, 21 Drawing Sheets

(56) References Cited

U.S. PATENT DOCUMENTS

| | | | |
|---|---|---|---|
| 5,353,346 A * | 10/1994 | Cox et al. ................... 379/386 |
| 5,417,211 A * | 5/1995 | Abraham-Fuchs et al. .. 600/409 |
| 5,561,431 A * | 10/1996 | Peele et al. .................. 342/90 |
| 5,596,993 A * | 1/1997 | Oriol et al. .................. 600/511 |
| 5,640,492 A * | 6/1997 | Cortes et al. ................ 706/20 |
| 5,765,029 A * | 6/1998 | Schweid et al. ............. 706/52 |
| 5,956,721 A * | 9/1999 | Douceur et al. |
| 5,983,170 A * | 11/1999 | Goodman .................... 704/9 |
| 6,009,199 A | 12/1999 | Ho |
| 6,185,328 B1 | 2/2001 | Shiau |
| 6,185,336 B1 | 2/2001 | Clark et al. |
| 6,192,360 B1 | 2/2001 | Dumais et al. |
| 6,229,923 B1 | 5/2001 | Williams et al. |
| 6,243,670 B1 * | 6/2001 | Bessho ............... G06F 17/2785 704/9 |
| 6,304,773 B1 | 10/2001 | Taylor et al. |
| 6,459,974 B1 | 10/2002 | Baloch et al. |
| 6,490,556 B1 | 12/2002 | Graumann et al. |
| 6,578,056 B1 | 6/2003 | Lamburt |
| 6,671,680 B1 * | 12/2003 | Iwamoto et al. ............. 707/737 |
| 6,879,951 B1 * | 4/2005 | Kuo .............................. 704/10 |
| 6,901,399 B1 * | 5/2005 | Corston et al. |
| 7,003,442 B1 * | 2/2006 | Tsuda ............................ 704/9 |
| 7,028,024 B1 | 4/2006 | Kommers et al. |
| 7,100,111 B2 | 8/2006 | McElfresh et al. |
| 7,113,934 B2 * | 9/2006 | Levesque ............... H04L 41/20 |
| 7,160,488 B2 * | 1/2007 | Ichikawa et al. ............. 264/1.1 |
| 7,185,075 B1 * | 2/2007 | Mishra ................... H04L 12/24 379/207.01 |
| 7,325,201 B2 | 1/2008 | Ferrari et al. |
| 7,363,359 B1 * | 4/2008 | Tripathy ................. H04L 41/20 370/350 |
| 7,366,989 B2 * | 4/2008 | Naik ..................... H04L 41/082 715/736 |
| 7,428,528 B1 | 9/2008 | Ferrari et al. |
| 7,577,655 B2 * | 8/2009 | Curtiss et al. |
| 7,710,897 B2 * | 5/2010 | Galou ..................... H04L 41/12 369/47.28 |
| 7,720,830 B2 * | 5/2010 | Wen et al. .................... 707/705 |
| 7,743,010 B2 | 6/2010 | Paulus et al. |
| 7,873,616 B2 | 1/2011 | Schickel-Zuber et al. |
| 7,877,238 B2 * | 1/2011 | Watanabe et al. ................ 703/2 |
| 7,899,832 B2 | 3/2011 | Abhyankar et al. |
| 7,912,871 B2 | 3/2011 | Shmueli et al. |
| 7,921,106 B2 * | 4/2011 | Chen et al. .................... 707/723 |
| 8,001,130 B2 * | 8/2011 | Wen et al. ..................... 707/750 |
| 8,065,307 B2 * | 11/2011 | Haslam et al. ................. 707/738 |
| 8,249,351 B2 * | 8/2012 | Ozawa ................... G06F 17/243 382/176 |
| 8,433,137 B2 * | 4/2013 | Liu .................... G06F 17/30247 382/181 |
| 2003/0088563 A1 | 5/2003 | Yamane et al. |
| 2004/0083224 A1 | 4/2004 | Yoshida |
| 2004/0162806 A1 * | 8/2004 | Liu .................................. 707/1 |
| 2005/0114093 A1 | 5/2005 | Cha et al. |
| 2005/0165819 A1 | 7/2005 | Kudoh et al. |
| 2005/0180637 A1 * | 8/2005 | Ikeda et al. ..................... 382/224 |
| 2006/0139518 A1 | 6/2006 | Wu et al. |
| 2008/0033915 A1 | 2/2008 | Chen et al. |
| 2008/0114564 A1 * | 5/2008 | Ihara ................ G06F 17/30321 702/158 |
| 2008/0221983 A1 | 9/2008 | Ausiannik et al. |
| 2009/0018996 A1 * | 1/2009 | Hunt ...................... G06Q 30/02 |
| 2009/0024615 A1 * | 1/2009 | Pedro ..................... G06F 19/324 |
| 2009/0132229 A1 * | 5/2009 | Tateno ............................ 704/1 |
| 2010/0063795 A1 * | 3/2010 | Sakao ............... G06F 17/30616 704/9 |
| 2010/0217763 A1 | 8/2010 | Park et al. |
| 2011/0153615 A1 | 6/2011 | Mizuguchi et al. |
| 2011/0238408 A1 | 9/2011 | Larcheveque et al. |
| 2011/0299780 A1 | 12/2011 | Napper |

FOREIGN PATENT DOCUMENTS

| | | |
|---|---|---|
| JP | 9-91314 A | 4/1997 |
| JP | 9-245055 A | 9/1997 |
| JP | 11-306187 A | 11/1999 |
| JP | 3096353 B | 8/2000 |
| JP | 2001216306 A | 8/2001 |
| JP | 2005036162 A | 2/2005 |
| JP | 2005063332 A | 3/2005 |
| JP | 2005202535 A | 7/2005 |
| JP | 2006139518 A | 6/2006 |
| JP | 2006171931 A | 6/2006 |
| JP | 2007102309 A | 4/2007 |

OTHER PUBLICATIONS

Prince et al., "Text Segmentation based on document understanding for information retrieval", 2007. NLDB 2007, LNCS 4592, pp. 295-304, 2007.*

Adams et al. "Semantic Indexing of Multimedia Content Using Visual, Audio and Text Cues". EURASIP Journal an Applied Signal Processing 2003:2, pp. 170-185.*

Strengert et al., "Hierarchical Visualization and Compression of Large Volume Datasets Using GPU Clusters"; European Symposium on Parallel Graphics and Visualization, 2004.*

Ohtsuki et al., "Automatic Indexing of Multimedia Content by Integration of Audio, Spoken Languages and Visual Information", NTT Cyber Space Laboratories, NTT Corporation, IEEE, 2003.*

International Search Report for PCT/JP2009/003602 mailed Oct. 20, 2009.

PubMed Home, National Center for Biotechnology Information, [Retrieved on Jun. 30, 2008], Internet <URL: http://www.ncbi.nlm.nih.gov/sites/entrez?db=PubMed>.

A. Inokuchi et al., "An OLAP Systems for Text Analytics" IEICE Technical Report, vol. 48, No. SIG11 (TOD34). Jun. 2007. pp. 58-68.

W. Dakka et al., "Automatic Construction of Multifaceted Browsing Interfaces", Proc. of CIKM' 05, 2005.

A. Inokuchi et al., "OLAP System for Analyzing Text", DBWeb 2006, Nov. 30, 2006, pp. 251-258.

K. Bessho et al., "Text Classification Method Based on Hierarchical Relations among Words", IEICE Technical Report, The Institute of Electronics, Information and Communication Engineers. PRMU2007-15, MI2007-15, 2007, pp. 79-84.

Hector Gonzalez et al., "Adaptive Fastest Path Computation on a Road Network: A Traffic Mining Approach", ACM Sep. 2007.

International Search Report of PCT Application No. PCT/JP2009/003601 mailed Oct. 20, 2009, from which U.S. Appl. No. 13/056,030 entered to US national stage.

US Office Action for U.S. Appl. No. 13/056,030 mailed on Sep. 12, 2012.

US Office Action for U.S. Appl. No. 13/056,030 mailed on May 22, 2013.

US Office Action for U.S. Appl. No. 13/056,030 mailed on Aug. 21, 2014.

Patent of U.S. Appl. No. 13/056,030.

US Office Action for U.S. Appl. No. 13/056,030 mailed on May 7, 2015.

Notice of Allowance for U.S. Appl. No. 13/056,030 mailed on Jan. 14, 2016.

* cited by examiner

| PARENT CLASSIFICATION | CHILD CLASSIFICATION |
|---|---|
| MAIN CATEGORY | SOCIETY, NATURE, ... |
| SOCIETY | LIVING, POLITICS, MEDICAL CARE |
| LIVING | HOME, FAMILY, HEALTH CARE |
| POLITICS | DIPLOMACY, ADMINISTRATION |
| MEDICAL CARE | MEDICINE, TRANSPLANT |
| ... | ... |

| BASIC CATEGORY |
|---|
| SOCIETY |
| NATURE |
| CULTURE |
| ... |

| DATA ID | CONTENT | CLASSIFICATION |
|---|---|---|
| d1 | ... | LIVING, FAMILY, HOME |
| d2 | ... | FAMILY, HOME, HEALTH CARE, MEDICINE |
| d3 | ... | HOME, FAMILY |
| d4 | ... | HEALTH CARE, DIPLOMACY, MEDICINE, TRANSPLANT |
| d5 | ... | DIPLOMACY |
| d6 | ... | MEDICINE, TRANSPLANT |

| CLASSIFICATION AXIS ID | BASIC CATEGORY | CLASSIFICATION | SCORE |
|---|---|---|---|
| 1 | SOCIETY | HOME, FAMILY, HEALTH CARE | 1 |
| 2 | SOCIETY | HOME, FAMILY, POLITICS | 1.33 |
| 3 | SOCIETY | HOME, FAMILY, DIPLOMACY | 1.67 |
| 4 | SOCIETY | HOME, FAMILY, MEDICAL CARE | 1.33 |
| ... | ... | ... | |

(A)

| CLASSIFICATION AXIS ID | CLASSIFICATION | DATA ID |
|---|---|---|
| 1 | HOME | d1, d2, d3 |
| 1 | FAMILY | d1, d2, d3 |
| 1 | HEALTH CARE | d2, d4 |
| 1 | OTHER | d5, d6 |
| ... | ... | ... |

CLASSIFICATION-SPECIFIED DATA QUANTITY TABLE

| CLASSIFICATION | DATA QUANTITY | DEPTH OF CLASSIFICATION |
|---|---|---|
| FAMILY | 3 | 2 |
| DIPLOMACY | 2 | 2 |
| MEDICAL CARE | 3 | 1 |

(A)

DATA-SPECIFIED CLASSIFICATION NUMBER TABLE

| DATA ID | NUMBER OF CLASSIFICATIONS |
|---|---|
| d1 | 1 |
| d2 | 2 |
| d3 | 1 |
| d4 | 2 |
| d5 | 1 |
| d6 | 1 |

CLASSIFICATION-SPECIFIED DATA QUANTITY TABLE

| CLASSIFICATION | DATA QUANTITY | DEPTH OF CLASSIFICATION |
|---|---|---|
| HOME | 3 | 2 |
| FAMILY | 3 | 2 |
| HEALTH CARE | 2 | 2 |

(A)

DATA-SPECIFIED CLASSIFICATION NUMBER TABLE

| DATA ID | NUMBER OF CLASSIFICATIONS |
|---|---|
| d1 | 2 |
| d2 | 3 |
| d3 | 2 |
| d4 | 1 |

(B)

| ORDER | BASIC CATEGORY | CLASSIFICATION | DATA QUANTITY |
|---|---|---|---|
| 1 | SOCIETY | LIVING | 4 |
| 2 | SOCIETY | MEDICAL CARE | 3 |
| 3 | SOCIETY | FAMILY | 3 |
| 4 | SOCIETY | HOME | 3 |
| 5 | SOCIETY | MEDICINE | 3 |
| 6 | SOCIETY | POLITICS | 2 |
| 7 | SOCIETY | HEALTH CARE | 2 |
| 8 | SOCIETY | DIPLOMACY | 2 |
| 9 | SOCIETY | TRANSPLANT | 2 |
| 10 | SOCIETY | ADMINISTRATION | 0 |

| DIMENSIONAL ID | CLASSIFICATION AXIS ID | SCORE |
|---|---|---|
| 1 | 1, 2 | 0.67 |
| 2 | 3, 4 | 0.5 |
| ... | ... | ... |

(B)

| CLASSIFICATION AXIS ID | BASIC CATEGORY | CLASSIFICATION |
|---|---|---|
| 1 | SOCIETY | HOME, FAMILY, HEALTH CARE |
| 2 | SOCIETY | HOME, FAMILY, POLITICS |
| 3 | SOCIETY | HOME, FAMILY, DIPLOMACY |
| 4 | SOCIETY | HOME, FAMILY, MEDICAL CARE |
| ... | ... | ... |

(C)

| CLASSIFICATION AXIS ID | CLASSIFICATION | DATA ID |
|---|---|---|
| 1 | HOME | d1, d2, d3 |
| 1 | FAMILY | d1, d2, d3 |
| 1 | HEALTH CARE | d2, d4 |
| 1 | OTHER | d5, d6 |
| ... | ... | ... |

FIG. 21

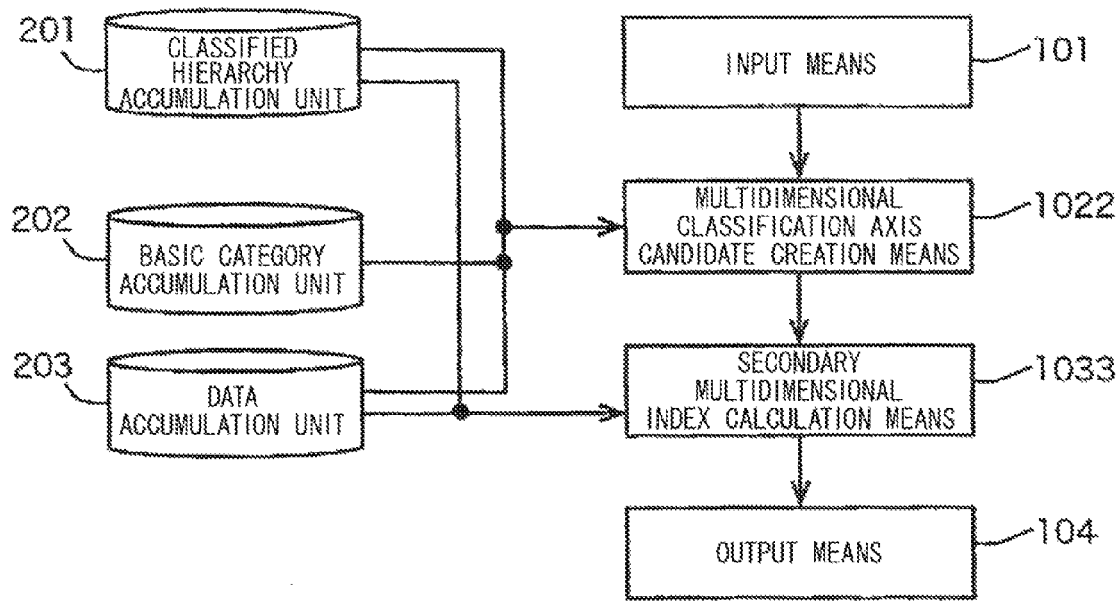

FIG. 22

CLASSIFICATION-SPECIFIED DATA QUANTITY TABLE

| COMBINATION OF CLASSIFICATIONS | DATA QUANTITY | DEPTH OF CLASSIFICATION |
|---|---|---|
| FAMILY, DIPLOMACY | 0 | 1 |
| FAMILY, MEDICINE | 1 | 1 |
| FAMILY, TRANSPLANT | 0 | 1 |
| HOME, DIPLOMACY | 0 | 1 |
| HOME, MEDICINE | 1 | 1 |
| HOME, TRANSPLANT | 0 | 1 |
| HEALTH CARE, DIPLOMACY | 1 | 1 |
| HEALTH CARE, MEDICINE | 2 | 1 |
| HEALTH CARE, TRANSPLANT | 1 | 1 |

(A)

DATA-SPECIFIED CLASSIFICATION NUMBER TABLE

| DATA ID | COMBINATION OF CLASSIFICATIONS |
|---|---|
| d1 | 0 |
| d2 | 1 |
| d3 | 0 |
| d4 | 2 |
| d5 | 0 |
| d6 | 0 |

(B)

DATA CLASSIFIER SYSTEM, DATA CLASSIFIER METHOD AND DATA CLASSIFIER PROGRAM

TECHNICAL FIELD

The present invention relates to data classifier systems, data classifier methods and data classifier programs.

The present application is the National Phase of PCT/JP2009/003602, filed Jul. 29, 2009, which claims priority on Japanese Patent Application No. 2008-195896 filed in Japan on Jul. 30, 2008, the content of which is incorporated herein by reference.

BACKGROUND ART

Data reduction techniques usually adopt hierarchical classifications to reduce numerous data. In the database disclosed in Non-Patent Document 1, for example, hierarchical classifications referred to as MeSH terms are assigned to documents. In the patent database operated by the Patent Office, for example, a plurality of hierarchical classifications such as F terms is assigned to patent documents. Hereinafter, hierarchical classifications assigned to data will be referred to as classification hierarchy.

Non-Patent Document 2 discloses a relevant art that allows users to read documents assigned with the aforementioned hierarchical classifications. Non-Patent Document 2 discloses a system, referred to as OLAP, which extends multi-faceted data display methods so as to achieve high-speed processing with respect to a very large hierarchy. In the relevant art disclosed in Non-Patent Document 2, users are each allowed to select a classification so as to display data quantity included in the classification at a high speed. In the relevant art disclosed in Non-Patent Document 2, users are each allowed to select a classification on a vertical axis and a classification on a horizontal axis so as to display the result by way of a table form.

Owing to the aforementioned operation, the relevant art disclosed in Non-Patent Document 2 is able to display a list of documents assigned with a plurality of classifications. Hereinafter, a group of classifications used for displaying data will be referred to as a classification axis.

In the case of a very large classification hierarchy, however, it is difficult for users to determine which classification needs to be selected. As documents used in the system disclosed in Non-Patent Document 2, for example, there are about five-hundred thousand documents and about thirty-four hundred thousand classifications. Therefore, it is very difficult for users to select display-wished classifications within the classification hierarchy.

Non-Patent Document 3 discloses a relevant classification selecting method. Non-Patent Document 3 discloses retrieval-resultant document lists via document retrieval along with a method of displaying classification axes related to retrieval-resultant document lists. According to the method disclosed in Non-Patent Document 3, keywords are input to retrieve documents so as to display retrieval-resultant documents while a plurality of classifications pre-assigned to retrieval-resultant documents is displayed as a classification axis. When displaying the classification axis, each classification needs to be selected because the display area is limited.

In addition, Non-Patent Document 3 discloses a method of selecting an upper-limit place among classifications in an order counting from a classification assigned to a larger number of retrieval-resultant documents and a method of selecting a combination of classifications which is able to display the largest number of retrieval-resultant documents. Furthermore, Non-Patent Document 3 discloses a method of minimizing cost such as the number of times a mouse needs to be clicked to display all the content.

PRIOR ART DOCUMENTS

Non-Patent Documents

Non-Patent Document 1: "PubMed", National Center for Biotechnology Information, [Retrieved on Jul. 4, 2008], Internet <URL: http://www.ncbi.nlm.nih.gov/sites/entrez?db=PubMed>

Non-Patent Document 2: Inoguchi, Takeda, "An OLAP Systems for Text Analytics", IEICE Technical Report, vol. 48, No. SIG11 (T0D34), p. 58-p. 68

Non-Patent Document 3: Wisam Dakka, Panagiotis G. Iperirotis, Kenneth R. Wood, "Automatic Construction of Multifaceted Browsing Interfaces", Proc. Of CIKM '05, p. 768-p. 775

DISCLOSURE OF INVENTION

Problem to be Solved by the Invention

Even when the relevant arts disclosed in Non-Patent Documents 1 through 3 are adopted, they are simply designed to perform data classifications based on distributions of data; hence, they do not allow users to select user-comprehensible classifications. The reason is that the relevant arts disclosed in Non-Patent Documents 1 through 3 do not consider the semantic independence of hierarchy among classifications.

In order to demonstrate the outline comprehension or item reduction by use of classification axes, it is preferable that terms representing a certain degree of independence of semantics be included in classifications on classification axes. This is because users are unable to comprehend differences between similar classifications. Similar classifications usually contain similar data correlated to each other, so that it is difficult to use them in terms of the outline comprehension and item reduction.

An example of the classified hierarchy shown in FIG. 8 will be examined. The classified hierarchy shown in FIG. 8 is disclosed in the document "Wikimedia Foundation Inc., Wikipedia, http://ja.wikipedia.org/", for example. In the example of FIG. 8, the classified hierarchy has a root classification of "Main Category", in which each node denotes each item of classification. In the illustration, arrows represent parent-child relationships. In the illustration, " . . . " indicates the existence of other nodes or partial hierarchies.

Ideally, it is preferable that the classified hierarchy have a tree structure or a direct acyclic graph structure (i.e. a graph structure including directions but no cycles). In the example of FIG. 8, classifications "family" and "home" are regarded as similar classifications. If these two classifications are selected, it is anticipated that their correspondent data are similar to each other; hence, they are hardly used in terms of the outline comprehension and item reduction. Other combinations of classifications such as "diplomacy" and "administration", "family law" and "family member", and "government" and "public office" are regarded as similar classifications; hence, they are hardly used in terms of the outline comprehension and item reduction.

As described above, the classified hierarchy is usually created in an ad hoc manner, whereby similar classifications frequently emerge in the same hierarchy. Even when classifications are selected based on resultant data retrieved using a certain retrieval keyword, similar classifications must be selected based on data distribution. For instance, the retrieval result using a retrieval keyword "family" will be examined. In this case, data adapted to this keyword "family" may usually contain data belonging to "family" and "home" in the classified hierarchy. When classifications having the highest data quantity are selected using data distribution, "family" and "home" must be selected. Therefore, it is preferable that classifications be selected in light of semantic independence of classifications.

A problem to be solved by the present invention is to provide a data classifier system, a data classifier method and a data classifier program, which are able to provide users with classification axes in light of independences based on hierarchical distances of classifications in the classified hierarchy upon being given the classified hierarchy and data groups correlated to classifications.

Means to Solve the Problem

The present invention is made to solve the above problem and directed to a data classifier system which selects a plurality of classifications correlated to data groups based on hierarchical classifications and data groups so as to output classification axes. The data classifier system includes a basic category accumulation means which accumulates classifications serving as basic categories used for selecting desired classifications in advance, a classification axis candidate creation means which creates classification axis candidates based on combinations of classifications each correlated to at least one data among descendant classifications of each basic category, and a priority calculation means which calculates priorities with respect to the classification axis candidates created by the classification axis candidate creation means based on hierarchical distances of classifications in a classified hierarchy.

Another aspect of the present invention is directed to a data classifier system which selects a plurality of classifications correlated to data groups so as to create classification axes based on hierarchical classifications and data groups and thereby output combinations of classification axes. The data classifier system includes a basic category accumulation means which accumulates classifications serving as basic categories used for selecting desired classifications in advance, a multidimensional classification axis candidate creation means which creates classification axis candidates based on combinations of classifications each correlated to at least one data among descendant classifications of each basic category and which creates multidimensional classification axis candidates each combining a plurality of classification axis candidates, and a multidimensional priority calculation means which calculates priorities with respect to the multidimensional classification axis candidates created by the multidimensional classification axis candidate creation means based on hierarchical distances of classifications in a classified hierarchy.

The present invention is directed to a data classifier method which selects a plurality of classifications correlated to data groups based on hierarchical classifications and data groups so as to output classification axes. The data classifier method includes a classification axis candidate creation process which accumulates classifications serving as basic categories used for selecting desired classifications in a database in advance and which creates classification axis candidates based on combinations of classifications each correlated to at least one data among descendant classifications of each basic category, and a priority calculation process which calculates priorities with respect to the classification axis candidates created by the classification axis candidate creation process based on hierarchical distances of classifications in a classified hierarchy.

Another aspect of the present invention is directed to a data classifier method which selects a plurality of classifications correlated to data groups so as to create classification axes based on hierarchical classifications and data groups and thereby output combinations of classification axes. The data classifier method includes a multidimensional classification axis candidate creation process which accumulates classifications serving as basic categories used for selecting desired classifications in a database in advance, which creates classification axis candidates based on combinations of classifications each correlated to at least one data among descendant classifications of each basic category, and which creates multidimensional classification axis candidates each combining a plurality of classification axis candidates, and a multidimensional priority calculation process which calculates priorities with respect to the multidimensional classification axis candidates created by the multidimensional classification axis candidate creation means based on hierarchical distances of classifications in a classified hierarchy.

The present invention is directed to a data classifier program which selects a plurality of classifications correlated to data groups based on hierarchical classifications and data groups so as to output classification axes. The data classifier program causes a computer equipped with a basic category accumulation means, which accumulates classifications serving as basic categories used for selecting desired classifications in advance, to perform a classification axis candidate creation process which creates classification axis candidates based on combinations of classifications each correlated to at least one data among descendant classifications of each basic category, and a priority calculation process which calculates priorities with respect to the classification axis candidates created by the classification axis candidate creation process based on hierarchical distances of classifications in a classified hierarchy.

Another aspect of the present invention is directed to a data classifier program which selects a plurality of classifications correlated to data groups so as to create classification axes based on hierarchical classifications and data groups and thereby output combinations of classification axes. The data classifier program causes a computer equipped with a basic category accumulation means, which accumulates classifications serving as basic categories used for selecting desired classifications in advance, to perform a multidimensional classification axis candidate creation process which creates classification axis candidates based on combinations of classifications each correlated to at least one data among descendant classifications of each basic category and which thereby creates multidimensional classification axis candidates each combining a plurality of classification axis candidates, and a multidimensional priority calculation process which calculates priorities with respect to the multidimensional classification axis candidates created by the multidimensional classification axis candidate creation process based on hierarchical distances of classifications in a classified hierarchy.

Effect of the Invention

In the present invention, the priority calculation means determines priority on classification axis candidates in light of independences based on hierarchical distances of classifications. Thus, even when the classified hierarchy includes similar classifications, it is possible to provide users with user-comprehensible classification axes.

BRIEF DESCRIPTION OF THE DRAWINGS

FIG. 6(A) shows an example of a table including records correlated with a classification axis ID, a basic category, a classification and a score. FIG. 6(B) shows an example of a table including records correlated with a classification axis ID, a classification and a data ID.

FIG. 10(A) shows an example of a classification-specified data quantity table. FIG. 10(B) shows an example of a data-specified classification number table.

FIG. 11(A) shows another example of a classification-specified data quantity table. FIG. 11(B) shows another example of a data-specified classification number table.

FIG. 20(A) shows an example of a table including records correlated with a dimensional ID, a classification axis ID and a score. FIG. 20(B) shows an example of a table including records correlated with a classification axis ID, a basic category and a classification. FIG. 20(C) shows an example of a table including records correlated with a classification axis ID, a classification and a data ID.

FIG. 21 A block diagram showing an example of the constitution of a data classifier system according to a sixth embodiment.

FIG. 22(A) shows an example of a classification-specified data quantity table. FIG. 22(B) shows an example of a data-specified classification number table.

MODE FOR CARRYING OUT THE INVENTION

Figures 1, 2, 3:
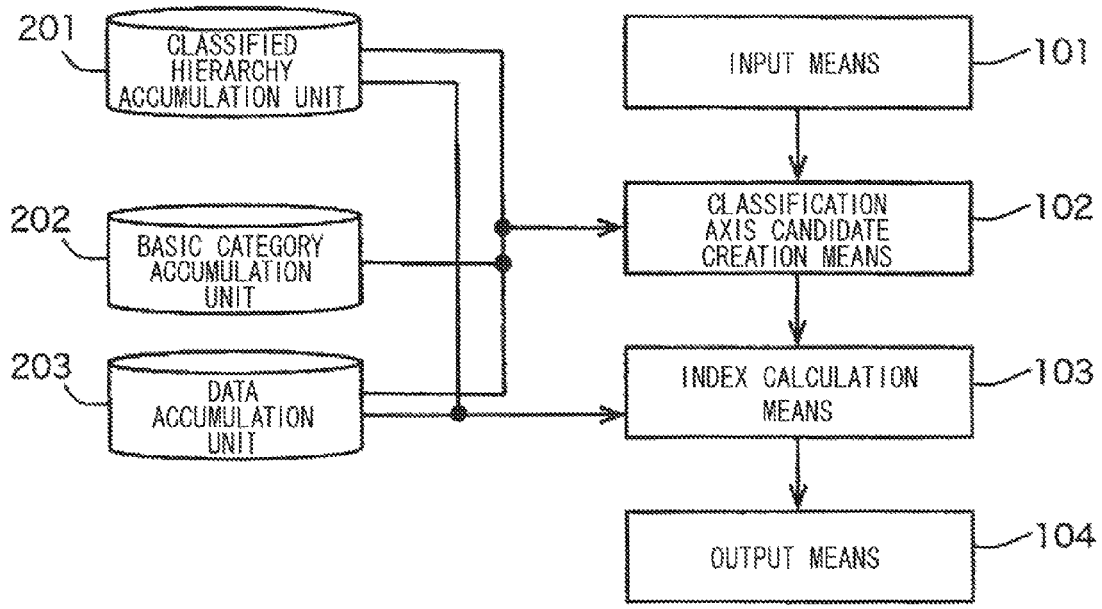
FIG. 1 A block diagram showing an example of the constitution of a data classifier system according to the present invention.
FIG. 2 An illustration showing an example of information stored in a classified hierarchy accumulation unit.
FIG. 3 An illustration showing an example of information stored in a basic category accumulation unit.

Hereinafter, the present invention will be described with reference to specific embodiments. A skilled person in the art may employ a variety of different embodiments based on the description of the present invention; hence, the present invention is not necessarily limited to embodiments which are illustrated herein for the purpose of explanation.

Hereinafter, various embodiments of the present invention will be described. First, the outline of a data classifier system according to the present invention will be described. In data classification, similar classifications are usually placed in a brother relationship. Therefore, in light of the semantic independence of classifications, the present invention employs hierarchical distances of classifications.

Upon receipt of the classified hierarchy and data groups correlated to classifications, the data classifier system of the present invention determines priority reflecting the independency based on hierarchical distances of classifications in the classified hierarchy. Specifically, the data classifier system is constituted of a classification axis candidate creation means and an index calculation means. The classification axis candidate creation means creates classification axis candidates based on at least a specific number of combinations between a specific number of data and counterpart classifications. The index calculation means receives (inputs) classification axis candidates so as to calculate priority based on hierarchical distances of classifications.

The aforementioned constitution achieves the object of the present invention in which the index calculation means provides users with user-comprehensible classification axes in light of the independence of classifications.

The data classifier system of the present invention is constituted of a classification axis candidate reduction means and an index calculation means. Upon being provided with the classified hierarchy and data groups correlated to classifications, the classification axis candidate reduction means creates classification axis candidates such that hierarchical distances of classifications and data quantity satisfy specific conditions. The index calculation means determines priorities on classification axis candidates based on hierarchical distances of classifications in the classified hierarchy considering the independence.

The data classifier system of the present invention is constituted of a classification axis candidate reduction means and a secondary index calculation means. Upon being provided with the classified hierarchy and data groups correlated to classifications, the classification axis candidate reduction means creates classification axis candidates such that hierarchical distances of classifications and data quantity satisfy specific conditions. In addition, the secondary index calculation means determines priorities on classification axis candidates based on hierarchical distances of classifications in the classified hierarchy according to the dependency, based on depths of classifications in the classified hierarchy according to the concreteness, based on data quantity allocated to classifications according to the exhaustivity, and based on data redundancies according to the uniqueness.

The data classifier system of the present invention is constituted of a classification axis candidate reduction means, a secondary index calculation means and a display means. Upon being provided with the classified hierarchy and data groups correlated to classifications, the classification axis candidate reduction means creates classification axis candidates such that hierarchical distances of classifications and data quantity satisfy specific conditions. The secondary index calculation means determines priorities on classification axis candidates based on hierarchical distances of classification and data quantity considering the independence, based on depths of classifications in the classified hierarchy considering the concreteness, based on data quantity allocated to classifications considering the exhaustivity, and based on data redundancies considering the uniqueness. The display means uses classification axes having higher priorities among classification axis candidates so as to display a data list and classifications assigned to each classification axis.

The data classifier system of the present invention is constituted of a multidimensional classification axis candidate reduction means and a multidimensional index calculation means. Upon being provided with the classified hierarchy and data groups allocated to classifications, the multidimensional classification axis candidate reduction means creates classification axes based on combinations of classifications, thus creating multidimensional classification axes based on combinations of classification axes. The multidimensional index calculation means calculates priorities on multidimensional classification axis candidates by use of hierarchical distances of classifications assigned to classification axes of respective dimensions.

The data classifier system of the present invention is constituted of a multidimensional classification axis candidate reduction means and a secondary multidimensional index calculation means. Upon being provided with the classified hierarchy and data groups allocated to classifications, the multidimensional classification axis candidate reduction means creates classification axes based on combinations of classifications, thus creating multidimensional classification axes based on combinations of classification axes. The secondary multidimensional index calculation means determines priorities on multidimensional classification axis candidates by use of at least one of depths of classification axis candidates of respective dimensions in the classified hierarchy, data quantity and data redundancies in addition to hierarchical distances of classifications assigned to classifications of respective dimensions.

The data classifier system of the present invention is constituted of a multidimensional classification axis reduction means and a secondary multidimensional index calculation means. Upon being provided with the classified hierarchy and data groups allocated to classifications, the multidimensional classification axis reduction means creates classification axes based on classifications satisfying conditions for limiting data quantity of classifications and hierarchical distances of classifications, thus creating multidimensional classification axes based on combinations of classification axes. The secondary index calculation means determines priorities on multidimensional classification axis candidates by use of at least one of depths of classification axis candidates of respective dimensions in the classified hierarchy, data quantity and data redundancies in addition to hierarchical distances of classifications assigned to classifications of respective dimensions.

The data classifier system of the present invention is constituted of a multidimensional classification axis candidate reduction means, a secondary multidimensional index calculation means and a multidimensional display means. Upon being provided with the classified hierarchy and data groups allocated to classifications, the multidimensional classification axis candidate reduction means creates classification axes based on classifications satisfying conditions for limiting hierarchical distances of classifications and data quantity, thus creating multidimensional classification axes based on combinations of classification axes. The secondary multidimensional index calculation means determines priorities on multidimensional classification axis candidates by use of at least one of depths of classification axis candidates of respective dimensions in the classified hierarchy, data quantity and data redundancies in addition to hierarchical distances of classifications assigned to classification axes of respective dimensions. The multidimensional display means displays classification axes of respective dimensions and classifications, thus displaying a list of data upon reducing data groups by selecting one or plural classifications.

The data classifier system of the present invention is constituted of a data retrieval means, a multidimensional classification axis candidate reduction means, a secondary multidimensional index calculation means and a multidimensional display means. Upon being provided with the classified hierarchy and data groups assigned to classifications, the data retrieval means retrieves data so as to reduce retrieval-resultant data groups. The multidimensional classification axis candidate reduction means creates classification axes based on classifications satisfying conditions for limiting hierarchical distances of classifications and retrieval-resultant data quantity, thus creating multidimensional classification axes based on combinations of classification axes. The secondary multidimensional index calculation means determines priorities on multidimensional classification axis candidates by use of at least one of depths of classification axis candidates of respective dimensions in the classified hierarchy, retrieval-resultant data quantity and retrieval-resultant data redundancies in addition to hierarchical distances of classifications assigned to classification axes of respective dimensions. The multidimensional display means displays classifications and classification axes of respective dimensions, thus displaying a list of retrieval-resultant data upon reducing data groups by selecting one or plural classifications.

The data classifier system of the present invention is constituted of a data correlation means, a data retrieval means, a multidimensional classification axis candidate reduction means, a secondary multidimensional index calculation means and a multidimensional display means. Upon being provided with the classified hierarchy and data groups allocated to classifications, the data correlation means performs a correlation procedure on data not correlated with classifications or data insufficiently correlated with classifications. The data retrieval means retrieves data so as to reduce retrieval-resultant data groups. The multidimensional classification axis candidate reduction means creates classification axes based on classifications satisfying conditions for limiting hierarchical distances of classifications and retrieval-resultant data quantity, thus creating multidimensional classification axes based on combinations of classification axes. The secondary multidimensional index calculation means determines priorities on multidimensional classification axis candidates by use of at least one of depths of classification axis candidates of respective dimensions in the classified hierarchy, retrieval-resultant data quantity and retrieval-resultant data redundancies in addition to hierarchical distances of classifications assigned to classification axes of respective dimensions. The multidimensional display means displays classifications and classification axes of respective dimensions, thus displaying a list of retrieval-resultant data upon reducing data groups by selecting one or plural classifications.

First Embodiment

Next, a first embodiment of the present invention will be described with reference to the drawings. FIG. 1 is a block diagram showing an example of the constitution of a data classifier system according to the present invention. As shown in FIG. 1, the data classifier system includes an input means 101, a classification axis candidate creation means 102, an index calculation means 103, an output means 104, a classified hierarchy accumulation unit 201, a basic category accumulation unit 202 and a data accumulation unit 203.

Specifically, in the present embodiment, the data classifier system is configured of an information processing device such as a personal computer which operates according to programs. In this connection, the data classifier system is not necessarily limited to a single information processing device but can be embodied using a plurality of information processing devices, for example.

Specifically, the classified hierarchy accumulation unit 201 is configured of a database device such as a magnetic disk device and an optical disk device. The classified hierarchy accumulation unit 201 accumulates the information representing the classified hierarchy and the hierarchical relationship in advance. FIG. 2 shows an example of the information stored in the classified hierarchy accumulation unit 201. As shown in FIG. 2, the classified hierarchy accumulation unit 201 integrates records in the parent-child relationship and stores a table describing the correlation between parent classifications and child classifications.

The table shown in FIG. 2 is created by a system operator in advance for the purpose of data reduction, for example, and accumulated in the classified hierarchy accumulation unit 201. The data classifier system can automatically retrieve classifications based on data accumulated in a document database so as to create a table, for example, which can be stored in the classified hierarchy accumulation unit 201.

In an example of FIG. 2, parent classifications represent classifications serving as parents in the parent-child relationship. Child classifications represent classifications serving as children by use of delimiters of ",". In this illustration, "..." denotes omission marks.

FIG. 2 shows an example of a storage method; for instance, the classified hierarchy accumulation unit 201 can divide and store child classifications by records or store hierarchical structure data. For the sake of simplifying expressions, the present embodiment employs the expression shown in FIG. 2.

Specifically, the basic category accumulation unit 202 is configured of a database device such as a magnetic disk device and an optical disk device. The basic category accumulation unit 202 accumulates names of classifications serving as the basis of classification axes in advance. FIG. 3 shows an example of the information stored in the basic category accumulation unit 202. As shown in FIG. 3, the basic category accumulation unit 202 stores a list of basic categories.

In this connection, basic categories stored in the basic category accumulation unit 202 are selected from among classifications stored in the classified hierarchy accumulation unit 201 in advance. In this case, for example, basic categories can be selected by a system operator in advance and accumulates in the basic category accumulation unit 202; alternatively, the data classifier system can automatically extract basic categories from the classified hierarchy accumulation unit 201, thus storing them in the basic category accumulation unit 202.

Figures 4, 5:
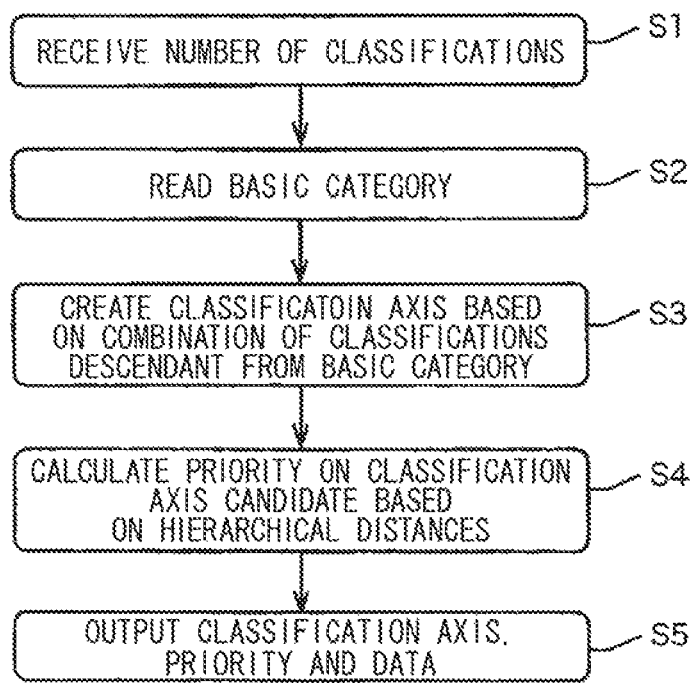
FIG. 4 An illustration showing an example of information stored in a data accumulation unit.
FIG. 5 A flowchart showing an example of a data classification process performed by a data classifier system.

Specifically, the data accumulation unit 203 is configured of a database device such as a magnetic disk device and an optical disk device. The data accumulation unit 203 accumulates the correlation between classifications and data in advance. Alternatively, the data accumulation unit 203 can accumulate the attribute information such as creation dates/times and other attributes of data and the contents. FIG. 4 shows an example of the information stored in the data accumulation unit 203. As shown in FIG. 4, the data accumulation unit 203 is a database storing records embracing the correlation between a data ID, content and a counterpart classification.

In an example of FIG. 4, "..." denotes omission marks. In this example of FIG. 4, the data ID is an identifier for identifying data. In addition, the counterpart classification indicates a classification correlated to data identified by the data ID by use of a delimiter ",". In this connection, FIG. 4 shows an example of a storage method; hence, the data accumulation unit 203 can store records embracing the attribute information representing attributes such as creation dates other than detailed content.

The aforementioned data are collected by a system operator in advance, for example, and accumulated in the data accumulation unit 203. In addition, the data classifier system can collect accumulated data of databases via networks, for example, so as to store them in the data accumulation unit 203.

Specifically, the input means 101 is configured of a CPU, an input device such as a keyboard and a mouse, and an input/output interface in an information processing device which operates according to programs. The input means 101 implements a function of inputting various pieces of information according to user's operations. Alternatively, the input means 101 implements a function of receiving (inputting) the input information from the other system. In the data classifier system of the present embodiment, the input means 101 may receive (input) the number of classifications N according to user's operations.

Specifically, the classification axis candidate creation means 102 is configured of a CPU of an information processing device which operates according to programs. The classification axis candidate creation means 102 implements functions of receiving (inputting) the number N of classifications from the input means 101 and creating classification axis candidates each combining the number N of classifications among classifications descendant from each basic category based on basic categories stored in the basic category accumulation unit 202, classifications stored in the classified hierarchy accumulation unit 20 and the information stored in the data accumulation unit 103. Herein, the classification axis candidate creation means 102 creates classification axis candidates using classifications each correlated to the predetermined number or more of data.

When counting the number of data allocated to classifications, the classification axis candidate creation means 102 counts the number of data allocated to descendant classifications. The classification axis candidate creation means 102 does not need to create combinations of classifications placed in the ancestor-descendant relationship. This is because ascendant classifications may embrace data of descendant classifications.

Specifically, the index calculation means 103 is configured of a CPU of an information processing device which operates according to programs. The index calculation means 103 implements functions of receiving (inputting) classification axis candidates from the classification axis candidate creation means 102, referring to the information stored in the classified hierarchy accumulation unit 201 and the information stored in the data accumulation unit 203, and calculating priorities on classification axis candidates.

The index calculation means 103 calculate priorities based on hierarchical distances of classifications in the classified hierarchy. Herein, the term "hierarchical distances of classifications" represents the shortest/longest path lengths leading to common ancestors or the shortest/longest path lengths leading to common descendants. In addition, the index calculation means 103 calculates priorities as average values and maximum/minimum values among hierarchical distances of classifications on classification axes.

In the present embodiment, the index calculation means 103 calculates the shortest path lengths leading to common ancestors as hierarchical distances of classifications while calculating priorities as average values among hierarchical distances. This indicates that classification axes having longer hierarchical distances are highly independent in terms of the semantics.

Specifically, the output means 104 is configured of a CPU, a display device such as a display, and an input/output interface of an information processing device which operates according to programs. The output means 104 implements a function of receiving (inputting) pairs of classification axis candidates and priorities from the index calculation means 103. In addition, the output means 104 implements a function of outputting input pairs of classification axis candidates and priorities together with data belonging to classifications. In this connection, it is possible to determine the number of classification axes output from the output means 104 in advance. As an output method, the output means 104 may display data on a display device such as a display or output files into storage media (e.g. CD-ROM) or other programs.

In the present embodiment, a storage device of an information processing device (not shown) implementing a data classifier system stores various programs realizing data classification. For instance, the storage device of the information processing device implementing the data classifier system stores a data classifier program which causes a computer to perform a classification axis candidate creation process for creating classification axis candidates based on combinations of classifications, each correlated to at least one data, among classifications descendant from each basic category and a priority calculation process for calculating priority on classification axis candidates that are created based on hierarchical distances of classifications in the classified hierarchy.

Next, the operation will be described. FIG. 5 is a flowchart showing an example of a data classifier process performed by the data classifier system.

First, the input means 101 of the data classifier system receives the number of classifications N according to a user's operation (step S1). For instance, the input means 101 inputs N=3 as the number of classifications. Next, the classification axis candidate creation means 102 obtains (extracts) basic categories of classification axes from the basic category accumulation unit 202 (step S2). In an example of FIG. 3, for example, the classification axis candidate creation means 102 extracts the information such as "society", "nature" and "culture" from the basic category accumulation unit 202.

Next, the classification axis candidate creation means 102 extracts classifications each correlated to a specific number or more of data from classifications descendant from each basic category with reference to the information stored in the classified hierarchy accumulation unit 201 and the information stored in the data accumulation unit 203, thus creating classification axis candidates each combing the predetermined number of classifications (step S3). Herein, the classification axis candidate creation means 102 does not use classifications having the ancestor-descendant relationship as ones used for creating classification axis candidates.

For instance, the following description is made with respect to the situation in which the number of classifications is N=3, the classified hierarchy accumulation unit 201 stores the information shown in FIG. 2, and the data accumulation unit 203 stores the information shown in FIG. 4. In this case, the classification axis candidate creation means 102 creates classification axis candidates each combining three classifications all descendant from the basic category "society" when the predetermined number of correlated data is set to two.

In this connection, classification axes are each expressed as "(basic category: classification list)". For instance, classification axes are expressed as (society: home, family, health care), (society: home, family, politics), (society: home, family, diplomacy), (society: home, family, medical care), (society: home, family, medicine), (society: home, family, transplant), (society: home, health care, politics) etc. In this case, the classification axis candidate creation means 102 does not need to produce classification axis candidates based on classification axes embracing the ancestor-descendant relationship such as (society: home, family, living). In addition, the classification axis candidate creation means 102 does not need to produce classification axis candidates based on classification axes embracing the classification "administration" whose number of correlated data is less than two.

Next, the index calculation means 103 obtains (inputs) classification axis candidates from the classification axis candidate creation means 102 so as to calculate priorities on classification axes with reference to the information stored in the classified hierarchy accumulation unit 201 (step S4). In the present embodiment, the index calculation means 103 secures semantic independences among classifications when calculating priorities; hence, it calculates average values among hierarchical distances of classifications. In the present embodiment, the index calculation means 103 calculates shortest paths leading to classifications of common ancestors as hierarchical distances of classifications.

Specifically, the index calculation means 103 calculates priorities according to Equation (1).

$$\text{Priority}(X:C) = 1/\text{Max}(X) \times 1/(2 \times \text{number of combinations}) \times \Sigma \text{ComDist}(c_i, c_j) \qquad (1)$$

In Equation (1), X denotes a basic category, and C denotes classifications. In addition, $c_i$, $c_j$ denotes a classification i and a classification j respectively. Max(X) denotes the depth of a deepest classification among descendant classifications belonging to the basic category X. ComDist($c_i$,$c_j$) denotes a distance between classifications $c_i$ and $c_j$. Furthermore, the number of combinations is the number of times for selecting two classifications out of classifications C. The reason why Equation (1) divides the average value by Max(X)) is that basic categories have different depths.

For instance, the index calculation means 103 calculates a priority on a classification axis (society: home, family, health care) according to Equation (2) using Equation (1). In this case, the number of classifications is N=3; hence, the number of combined classifications is three. In the case of the classified hierarchy shown in FIG. 2, the deepest classification among classifications descendant from the basic category "society" is set to 2.

$$\text{Priority(society: home, family, health care)} = \frac{1}{2} \times \frac{1}{6} \times \\ (\text{ComDist(home, family)} + \text{ComDist(home, health care)} + \text{ComDist(family, health care)}) \quad (2)$$

Since classifications "family" and "home" are correlated to the common ancestor of "living", the index calculation means 103 produces ComDist (home, family)=2. Since other classifications are combined with the common ancestor of "living", the index calculation means 103 produces 2 for all those classifications. Therefore, the index calculation means 103 calculates a priority on a classification axis (society: home, family, health care) according to Equation (3).

$$\text{Priority(society: home, family, health care)} = \frac{1}{2} \times \frac{1}{6} \times \\ (\text{ComDist(home, family)} + \text{ComDist(home, health care)} + \text{ComDist(family, health care)}) = \frac{1}{2} \times \frac{1}{6} \times (2+2+2) = 0.5 \quad (3)$$

In addition, the index calculation means 103 calculates a priority on a classification axis (society: home, health care, medical care) according to Equation (4).

$$\text{Priority(society: home, health care, medical care)} = \frac{1}{2} \times \\ \frac{1}{6} \times (\text{ComDist(home, health care)} + \text{ComDist} \\ (\text{home, medical care}) + \text{ComDist(health care, medical care)}) \quad (4)$$

Since classifications "family" and "health care" are correlated to the common ancestor of "living", the index calculation means 103 produces ComDist (home, health care)=2. Since classifications "home" and "medical care" are correlated to the common ancestor of "society", the index calculation means 103 produces ComDist (home, medical care)=3 and ComDist (health care, medical care)=3. Therefore, the index calculation means 103 calculates a priority on the classification axis (society: home, health care, medical care) according to Equation (5).

$$\text{Priority(society: home, health care, medical care)} = \frac{1}{2} \times \\ \frac{1}{6} \times (\text{ComDist(home, health care)} + \text{ComDist} \\ (\text{home, medical care}) + \text{ComDist(health care, medical care)}) = \frac{1}{2} \times \frac{1}{6} \times (2+3+3) = 067 \quad (5)$$

Since the index calculation means 103 performs the aforementioned calculations, it is possible to give a high priority on classification axes each including semantically independent classifications rather than similar classifications.

Next, the output means 104 output classification axes and data correlated to priorities based on the calculation result of the index calculation means 103 (step S5). FIG. 6(A) and FIG. 6(B) show examples of the information output from the output means 104. In these examples shown in FIG. 6(A) and FIG. 6(B), the output means 104 outputs two tables.

As shown in FIG. 6(A), for example, the output means 104 outputs a table including records correlated with a classification axis ID, a basic category, classifications and a score. In FIG. 6(A), a record described in one row indicates a single classification axis. The classification axis ID is an ID for identifying classification axis candidates. The classifications include a plurality of classifications divided with a delimiter ",".

As shown in FIG. 6(B), for example, the output means 104 outputs a table including records correlated with a classification axis ID, a classification and a data ID. In FIG. 6(B), each record is correlated to each classification on each classification axis. The data ID includes a plurality of data IDs divided with a delimiter ",". In this illustration, " . . . " denotes omission marks.

In this connection, the output methods of FIG. 6(A) and FIG. 6(B) are illustrative; for instance, the output means 104 can output a single table combining two tables or additionally outputs a new table including the attribute data of respective data.

According to the aforementioned constitution, it is possible to select classification axes by use of semantic independences of classifications. This makes it possible for users to select comprehensive classification axes.

According to the present embodiment described above, the index calculation means 103 determines priorities on classification axis candidates considering independences based on hierarchical distances of classifications. For this reason, it is possible to provide users with user-comprehensible classification axes even when the classified hierarchy includes similar classifications.

Second Embodiment

Figures 6, 7:
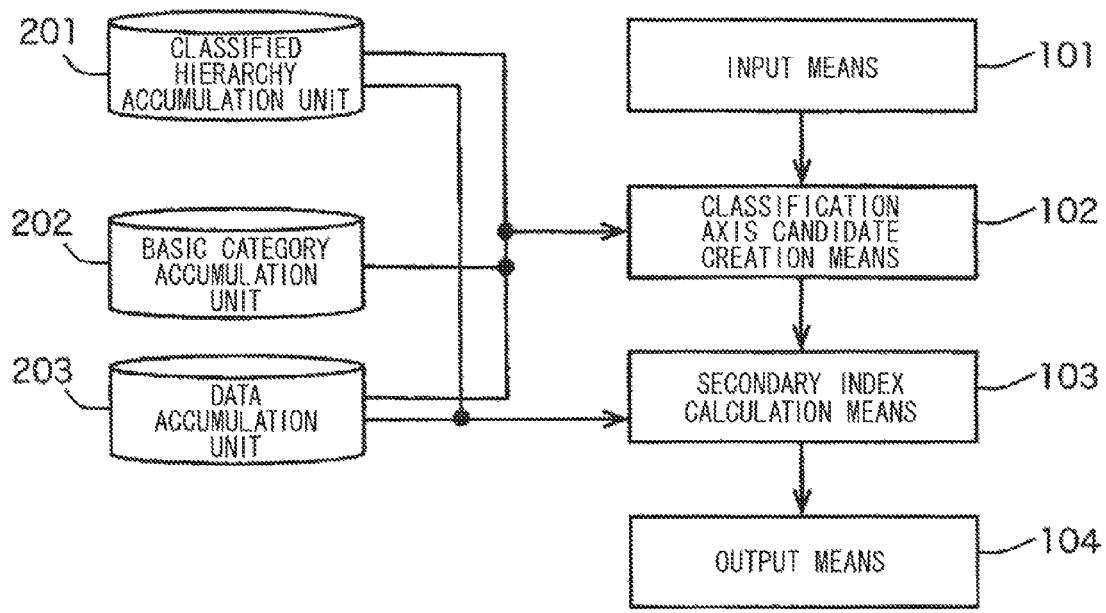
FIG. 7 A block diagram showing an example of the constitution of a data classifier system according to a second embodiment.

Next, a second embodiment of the present invention will be described. FIG. 7 is a block diagram showing an example of the constitution of a data classifier system according to the second embodiment. As shown in FIG. 7, the present embodiment differs from the first embodiment in that the index calculation means 103 shown in FIG. 1 is replaced with a secondary index calculation means 1031.

Specifically, the secondary index calculation means 1031 is configured of a CPU of an information processing device which operates according to programs. The secondary index calculation means 1031 has a function of receiving (inputting) classification axis candidates from the classification axis candidate creation means 102 and thereby calculating priority on classification axes. In the present embodiment, the secondary index calculation means 1031 calculates priority based on hierarchical depths of classifications, data quantity of classifications and data redundancy of classifications, or their combinations in addition to hierarchical distances of classifications.

The term "hierarchical distances of classifications" represents distances between classifications in the classified hierarchy; hence, it is identical to one described in the first embodiment. In the present embodiment, an index representing "hierarchical distances of classifications" will be referred to as an independence index.

The term "hierarchical depths of classifications" represents shortest/longest path lengths from classifications, serving as basic categories or roots of classified hierarchy, to other classifications. Classifications having large hierarchical depths are regarded as ones having specific semantics.

Figure 8:
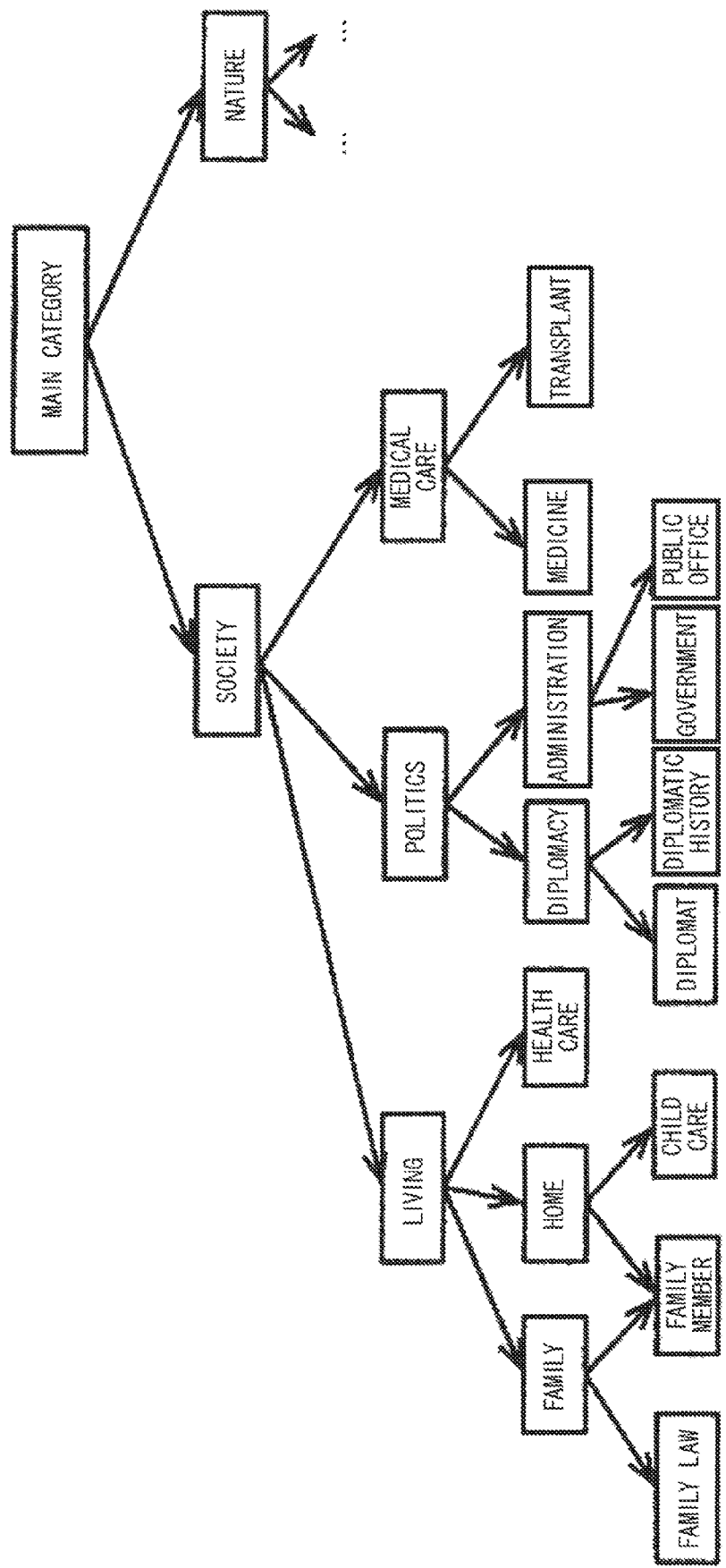
FIG. 8 An illustration showing an example of a classified hierarchy.

An example of the classified hierarchy shown in FIG. 8 will be discussed as follows. In the classified hierarchy shown in FIG. 8, the deepest classifications "family law" and "family member" are regarded as specific classifications compared to a classification "society". Specific classifications are deemed useful for users to comprehend configurations of data. In the present embodiment, the secondary index calculation unit 1031 handles shortest path lengths, from basic categories to other classifications, as hierarchical depths of classifications, so that it calculates a priority with higher values for classifications having larger hierarchical depths. In the present embodiment, an index representing "hierarchical depths of classifications" will be referred to as a specifics index.

The term "data quantity of classifications" represents the amount of data correlated to classifications. The term "data of classifications" represents data directly correlated to classifications or data correlated to classifications and their descendant classifications. In the present embodiment, the secondary index calculation means 1031 employs data correlated to classifications and their descendant classifications in terms of "data of classifications". In this case, classifications having larger data quantity are regarded as ones having higher exhaustivity. Since classification axes, which are created using classifications having high exhaustivity, precisely represent data accumulated in the data accumulation unit 203, they are deemed useful for users to comprehend the outline of data. In the present embodiment, the secondary index calculation means 1031 calculates priority with higher values for classifications having larger quantities of data. In the present embodiment, an index representing "data quantity of classifications" will be referred to as an exhaustivity index.

The term "data redundancy of classifications" indicates values representing the degree of correspondence among data on each of classifications assigned to classification axes. With a smaller data redundancy, data accumulated in the data accumulation unit 203 have uniqueness so that their outline can be easily comprehended. With redundant data having no uniqueness alone, a plenty of redundant data should be displayed in connection with classifications, whose classification axes cannot be regarded as good classification axes.

When the data accumulation unit 203 accumulates data shown in FIG. 4, for example, a classification "family" is correlated to data whose data IDs are "d1", "d2" and "d3". In addition, a classification "home" is also correlated to data whose data IDs are "d1", "d2" and "d3". Upon adopting a display method for displaying data quantity with respect to each classification on each classification axis, both the classifications "family" and "home" are assigned with the same amount of data, i.e. three, with the same content; hence, their classification axis does not have a significant amount of information. In this case, the secondary index calculation unit 1031 calculates priority whose value becomes lower as the data redundancy becomes higher. As the data redundancy, it is possible to use a value which is produced by dividing the total amount of data assigned to each classification by the amount of data having no redundancy; alternatively, it is possible to produce the amount of information (entropy) based on the occurrence probability of data. In the present embodiment, an index representing the "data redundancy of classifications" will be referred to as a uniqueness index.

In the present embodiment, the secondary index calculation unit 1031 finally produces the overall priority by use of the aforementioned indexes.

In the present embodiment, the functions of the constituent elements other than the secondary index calculation unit 1031 are equivalent to the functions of the counterpart constituent elements described in the first embodiment.

Figure 9:
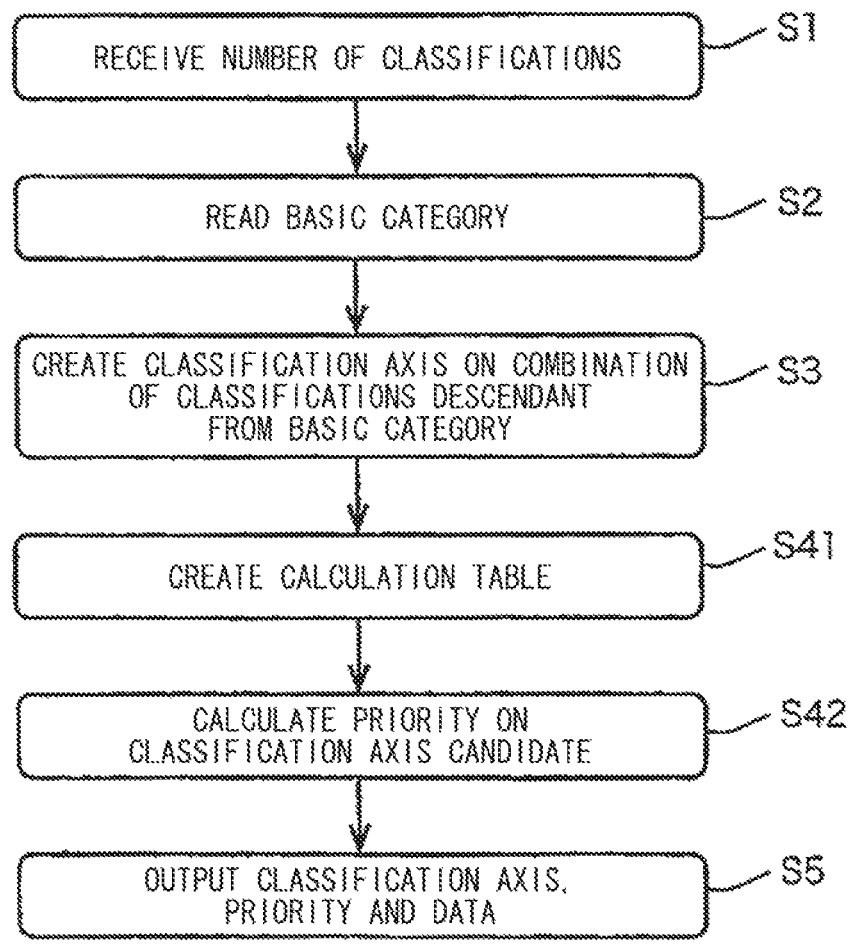
FIG. 9 A flowchart showing an example of a data classification process performed by the data classifier system of the second embodiment.

Next, the operation will be described. FIG. 9 is a flowchart showing an example of a data classification process performed by the data classifier system of the second embodiment. As shown in FIG. 9, the present embodiment differs from the first embodiment in that the process of step S41 for creating a calculation table and the process of step S42 for calculating priority on classification axis candidates are executed instead of the process of step S4 for calculating priority on classification axis candidates based on hierarchical distances of classifications. Hereinafter, the processes different from the first embodiment will be described.

Similar to the foregoing processes of the first embodiment, the input means 101 of the data classifier system receives the number of classifications N according to a user's operation (step S1). For instance, the input means 101 inputs N=3 as the number of classifications. Next, similar to the foregoing processes of the first embodiment, the classification axis candidate creation means 102 obtains (extracts) basic categories of classification axes from the basic category accumulation unit 202 (step S2). In an example of FIG. 3, the classification axis candidate creation means 102 extracts the information such as "society", "nature" and "culture" from the basic category accumulation unit 202.

Next, similar to the processing of the first embodiment, the classification axis creation means 102 obtains (extracts) classifications, each correlated to a specific number or more of data, among classifications descendant from each basic category with reference to the information stored in the classified hierarchy accumulation means 201 and the information stored in the data accumulation unit 203, thus creating classification axis candidates each combining the predetermined number of classifications (step S3). Herein, the classification axis candidate creation means 102 does not create classification axis candidates based on classifications embracing the ancestor-descendant relationship.

Next, the secondary index calculation means 1031 obtains (inputs) classification axis candidates from the classification axis candidate creation means 102, thus creating a calculation table with reference to the information stored in the classified hierarchy accumulation unit 201 and the information stored in the data accumulation unit 203 (step S41). Herein, the calculation table is a temporary table created for the purpose of calculating indexes; hence, the secondary index calculation means 1031 creates two tables, namely a classification-specified data quantity table and a data-specified classification number table.

The classification-specified data quantity table is a table counting the amount of data correlated to each classification, wherein it includes records correlated with classifications, data quantity and depths of classifications. The data-specified classification number table is a table counting the number of classifications on each classification axis correlated to each data, wherein it includes data IDs and classifications. In this connection, it is preferable that the secondary index calculation means 1031 extend tables, temporarily created for the purpose of calculations, on memory.

FIG. 10(A) and FIG. 10(B) show an example of a classification-specified data quantity table and an example of a data-specified classification number table. Herein, FIG. 10(A) shows an example of the classification-specified data quantity table. FIG. 10(B) shows an example of the data-specified classification number table. As shown in FIG. 10(A) and FIG. 10(B), the secondary index calculation means 1031 creates the classification-specified data quantity table and the data-specified classification number table based on classification axes (society: family, diplomacy, medical care), the information of FIG. 2 stored in the classified hierarchy accumulation unit 201 and the information of FIG. 4 stored in the data accumulation unit 203.

In FIG. 10(A), the classification-specified data quantity table is a table including records correlated with classifications, data quantity and depths of classifications. In the present embodiment, depths of classifications represent path lengths from each basic category to classifications. With reference to the information of FIG. 4 stored in the data accumulation unit 203, for example, the classification "family" is correlated to "d1", "d2" and "d3"; hence, as shown in FIG. 10(A), the amount of data is three. With reference to the information of FIG. 2 stored in the classified hierarchy accumulation unit 201, there are two depths lying from the basic category "society" to the classification "family" via "living".

In the present embodiment, the correlation between classifications and data is defined as data directly correlated to classifications and descendant classifications. For instance, no data is directly correlated to the classification "medical care": hence, it is necessary to check data directly correlated to its descendant classification. Herein, the descendant classification "medicine" or "health care" is correlated to data IDs of "d2", "d4" and "d6". Thus, as shown in FIG. 10(A), the amount of data is set to three.

The data-specified classification number table is a table including records correlated with data ID and the number of classifications. In the present embodiment, the data-specified classification number table shown in FIG. 10(B) describes the number of classifications assigned to a classification axis (society: family, diplomacy, medical care) with respect to each data ID. With reference to the information of FIG. 4 stored in the data accumulation unit 203, for example, the data ID "d1" is correlated to the classification "family" on each classification axis so that the number of classifications is one as show in FIG. 10(B). In addition, the data ID "d6" is correlated to a classification descendant from the classification "medical care", so that the number of classifications is one as shown in FIG. 10(B).

FIGS. 11(A) and 11(B) show other examples of the classification-specified data quantity table and the data-specified classification number table. Herein, FIG. 11(A) shows another example of the classification-specified data quantity table. In addition, FIG. 11(B) shows another example of the data-specified classification number table. In those examples shown in FIGS. 11(A) and 11(B), the secondary index calculation means 1031 creates the classification-specified data quantity table and the data-specified classification number table based on the classification axis (society: home, family, health care), the information of FIG. 2 stored in the classified hierarchy accumulation unit 201 and the information of FIG. 4 stored in the data accumulation unit 203.

In the example of FIG. 11(A), similar to the example of FIG. 10(A), for example, the classification "family" is correlated to "d1", "d2" and "d3" with reference to the information of FIG. 4 stored in the data accumulation unit 203; hence, the number of data is three as shown in FIG. 11(A). With reference to the information of FIG. 2 stored in the classified hierarchy accumulation unit 201, each of classifications ranging from "society" to "home" is set to two in depth via "living".

As shown in FIG. 11(B), the data-specified classification number table includes classifications correlated to the classification axis (society: home, family, health care) with respect to each data ID. With reference to the information of FIG. 4 stored in the data accumulation unit 203, for example, the data ID "d1" is correlated to classifications "home" and "family" in each classification axis, so that the number of classifications is two as shown in FIG. 11(B).

Next, the secondary index calculation means 1031 calculates priority on classification axes by use of the calculation table (step S42). In the present embodiment, the secondary index calculation means 1031 calculates indexes of independence, specifics, exhausitivity and uniqueness so as to produce a linear addition of these indexes, thus calculating the overall priority by use of Equation (6).

$$\text{Priority}(X:C) = W1 \times \text{Independence}(X:C) + W2 \times \text{Specifics}(X:C) + W3 \times \text{Exhausitivity}(X:C) + W4 \times \text{Uniqueness}(X:C) \tag{6}$$

In Equation (6), X denotes basic categories, and C denotes classifications. In addition, W1, W2, W3 and W4 denote weight coefficients to indexes. These weight coefficients can be set to the system in advance (e.g. preset values ca be stored in a storage unit such as a memory in advance), or they can be set by users. In the present embodiment, weight coefficients are set to the system in advance.

The present embodiment is equivalent to the first embodiment in terms of the independence index; hence, the secondary index calculation means 1031 produces it according to Equation (7).

$$\text{Independence}(X:C) = 1/\text{Max}(X) \times 1/(2 \times \text{number of combinations}) \times \Sigma \text{ComDist}(ci,cj) \tag{7}$$

In Equation (7), X, C, Max(X), the number of combinations and ComDist(ci,cj) are identical to those described in the first embodiment.

In addition, the secondary index calculation means 1031 calculates the specifics index according to Equation (8). Herein, the specifics index represents an average value of path lengths from each basic category to classifications on each classification axis.

$$\text{Specifics}(X:C) = 1/\text{Max}(X) \times 1/N \times \Sigma \text{Depth}(X,ci) \tag{8}$$

In Equation (8), Max(X) represents the maximum depth among classifications descendant from the basic category X. In addition, N represents the number of classifications given (input) by the input means 101. Furthermore, Depth(X,ci) represents the shortest path length from the basic category X to the classification ci. Herein, the average path length needs to be divided by Max(X) because each basic category is linked to descendant classifications having different depths. The secondary index calculation means 1031 is able to calculate the specifics index according to Equation (9) by use of the classification-specified data quantity table.

$$\text{Specifics}(X:C) = 1/\text{Max}(X) \times 1/N \times \Sigma \text{Depth}(X,ci) = 1/\text{Max}(X) \times 1/N \times \Sigma(\text{depths of classifications in the classification-specified data quantity table}) \tag{9}$$

Equation (9) shows that specifics indexes become high as depths of classifications become large.

The secondary index calculation means 1031 calculates the exhaustivity index according to Equation (10). Herein, the exhaustivity index is a cover ratio of data of each classification to all data.

$$\text{Exhaustivity}(X:C) = 1/\text{DataNum} \times |U\text{ Data}(ci)| \tag{10}$$

In Equation (10), DataNum denotes the amount of data subjected to classification. Data (ci) denotes a set of data allocated to a classification ci. In addition, "U Data (ci)" denotes a sum set of data ranging from a classification c1 to a classification cN on each classification axis. Furthermore, ⊕U Data (ci)| denotes the number of elements within a set of data ranging from the classification c1 to the classification cN on each classification axis. That is, |U Data (ci)| denotes the amount of data allocated to classifications. The secondary index calculation means 1031 is able to calculate the exhaustivity index according to Equation (11) using the previously created data-specified classification number table.

$$\text{Exhaustivity}(X:C) = 1/\text{DataNum} \times |U\text{ Data}(ci)| = 1/\text{DataNum} \times \text{RecNum}(\text{data-specified classification number table, number of classifications} > 0) \tag{11}$$

In Equation (11), RecNum (data-specified classification number table, number of classifications>0) denotes the number of records with the number of classifications greater than zero within the data-specified classification number table. This term of RecNum (data-specified classification number table, number of classifications>0) is equal to the amount of data allocated to classifications. Therefore, it can be rewritten as shown in Equation (11).

The secondary index calculation means 1031 calculates the uniqueness index according to Equation (12). Herein, the data redundancy is a value which is produced by dividing the total amount of data allocated to each classification by the amount of data having no redundancy. In this connection, the uniqueness index is expressed as the inverse of the data redundancy.

$$\text{Uniqueness}(X:C)=1/(1/|U\text{Data}(ci)|\times\Sigma\text{CatNum}(ci)) \quad (12)$$

In Equation (12), |U Data (ci)| denotes the amount of data having no redundancy allocated to each classification. In addition, CatNum(ci) denotes the amount of data allocated to the classification ci. Furthermore, $\Sigma$CatNum(ci) denotes the total amount of data ranging from the classification c1 to the classification cN on each classification axis. The secondary index calculation means 1031 is able to calculate the uniqueness index according to Equation (13) using the previously created classification-specified data quantity table.

$$\text{Uniqueness}(X:C)=1/(1/|U\text{Data}(ci)|\times\Sigma\text{CatNum}(ci))=1/\\(\text{RecNum(data-specified classification number}\\\text{table, number of classifications>0})\times\Sigma(\text{amount of}\\\text{data in data-specified classification number data}) \quad (13)$$

In the case of a classification axis (society: family, diplomacy, medical care), for example, the secondary index calculation means 1031 calculates the aforementioned indexes according to Equation (14) through Equation (17) with reference to the tables shown in FIG. 10(A) and FIG. 10(B) and the information of FIG. 2 stored in the classified hierarchy accumulation unit 201.

$$\text{Independence}(X:C)=1/\text{Max}(X)\times 1/(2\times\text{number of combinations})\times\Sigma\text{ComDist}(C1,C2)=1/\text{Max(society)}\times\\ 1/(2\times 3)\times(\text{ComDist(family, diplomacy)}+\text{ComDist}\\(\text{family, medical care})+\text{ComDist(diplomacy,}\\\text{medical care}))=\tfrac{1}{2}\times\tfrac{1}{6}\times(4+4+4)=1 \quad (14)$$

$$\text{Specifics}(X:C)=1/\text{Max}(X)\times 1/N\times\Sigma(\text{depths of classifications in classification-specified data quantity}\\\text{table})=1/\text{Max(society)}\tfrac{1}{3}\times(2+2+1)=\tfrac{1}{2}\times\tfrac{1}{3}\times(2+2+1)=0.833 \quad (15)$$

$$\text{Exhaustivity}(X:C)=1/\text{DataNum}\times\text{RecNum(data-specified classification number table, number of classifications>0})=\tfrac{1}{6}\times 6=1 \quad (16)$$

$$\text{Uniqueness}(X:C)=1/(\text{RecNum(data-specified classification number table, number of classifications>0})\times\Sigma(\text{amount of data in data-specified classification number table}))=1/(\tfrac{1}{6}\times(3+2+3))=\tfrac{6}{8}=0.75 \quad (17)$$

When all the weight coefficients are set to 0.25, the secondary index calculation means 1031 is able to calculate priority according to Equation (18).

$$\text{Priority}(X:C)=W1\times\text{Independency}(X:C)+W2\times\text{Specifics}\\(X:C)+W3\times\text{Exhaustivity}(X:C)+W4\times\text{Uniqueness}\\(X:C)=0.25\times 1+0.25\times 0.833+0.25\times 1+0.25\times\\0.75=0.895=0.90 \quad (18)$$

As other examples, in the case of the classification axis (society: home, family, health care), for example, the secondary index calculation means 1031 calculates the foregoing indexes according to Equations (19) through (22) with reference to the tables shown in FIGS. 11(A) and 11(B) and the information of FIG. 2 stored in the classified hierarchy accumulation unit 201.

$$\text{Independence}(X:C)=1/\text{Max}(X)\times 1/(2\times\text{number of combinations})\times\Sigma\text{ComDist}(C1,C2)=1/\text{Max(society)}\times$$

$$1/(2\times 3)\times(\text{ComDist(home, family)}+\text{ComDist(family, health care)}+\text{ComDist(family, health care)})=\tfrac{1}{2}\times\tfrac{1}{6}\times(2+2+2)=0.5 \quad (19)$$

$$\text{Specifics}(X:C)=1/\text{Max}(X)\times 1/N\times\Sigma(\text{depths of classifications in classification-specified data quantity}\\\text{table})=1/\text{Max(society)}\times\tfrac{1}{3}\times(2+2+2)=\tfrac{1}{2}\times\tfrac{1}{3}\times(2+2+2)=1 \quad (20)$$

$$\text{Exhaustivity}(X:C)=1/\text{DataNum}\times\text{RecNum(data-specified classification number table, number of classifications>0})=\tfrac{1}{6}\times 4=0.667 \quad (21)$$

$$\text{Uniqueness}(X:C)=1/(\text{RecNum(data-specified classification number table, number of classifications>0})\times\Sigma(\text{amount of data in data-specified classification number table}))=1/(\tfrac{1}{4}\times(3+3+2))=\tfrac{4}{8}=0.5 \quad (22)$$

When all the weight coefficients are set to 0.25, the secondary index calculation means 1031 is able to calculate priority according to Equation (23).

$$\text{Priority}(X:C)=W1\times\text{Independency}(X:C)+W2\times\text{Specifics}\\(X:C)+W3\times\text{Exhaustivity}(X:C)+W4\times\text{Uniqueness}\\(X:C)=0.25\times 0.5+0.25\times 1+0.25\times 0.667+0.25\times\\0.5=0.667=0.67 \quad (23)$$

Next, similar to the foregoing processes of the first embodiment, the output means 104 outputs classification axes, priority and data (step S5).

As described above, the present invention calculates priority based on hierarchical depths of classifications, data quantity of classifications and data redundancy of classifications, or their combinations in addition to hierarchical distances of classifications. For this reason, it is possible to effectively reduce the calculation time of priority on classification axes in light of hierarchical depths of classifications, data quantity of classifications and data redundancy of classifications in addition to hierarchical distances of classifications.

Third Embodiment

Figure 12:
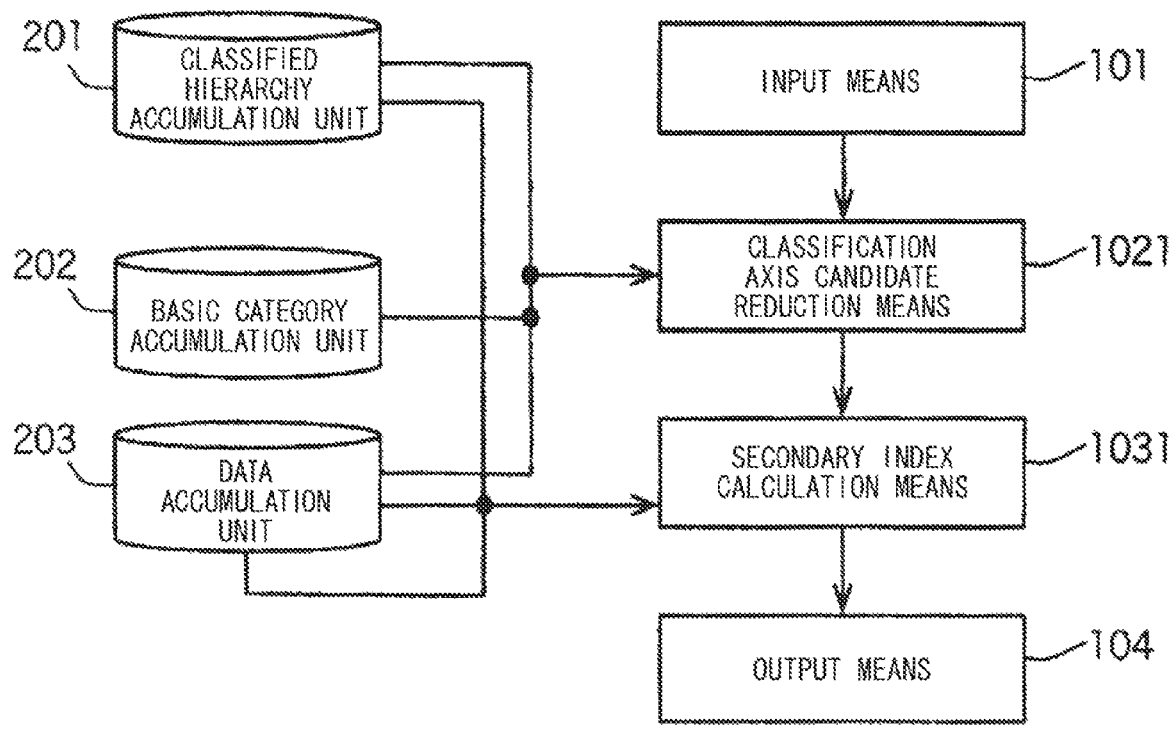
FIG. 12 A block diagram showing an example of the constitution of a data classifier system according to a third embodiment.

Next, a third embodiment of the present invention will be described. FIG. 12 is a block diagram showing an example of the constitution of a data classifier system according to the third embodiment. As shown in FIG. 12, the present embodiment differs from the second embodiment in that the data classifier system includes a classification axis candidate reduction means 1021 instead of the classification axis candidate creation means 102. The following description basically refers to the difference compared to the second embodiment.

Specifically, the classification axis reduction means 1021 is configured of a CPU of an information processing device which operates according to programs. The classification axis candidate reduction means 1021 does not create classification axis candidates combining all classifications descendant from each basic category but implements a function of reducing the number of classification axes which are created based on data quantity of classifications and hierarchical distances of classifications. Since the classification axis candidate reduction means 1021 is able to reduce the number of classification axes used for calculating priorities, thus achieving a high-speed calculation.

In this connection, the term "data quantity of classifications" indicates the number of data correlated to classifications. The term "data correlated to classifications" indicate data directly correlated to classifications or data correlated to classifications and descendant classifications. In the present embodiment, "data correlated to classifications" are regarded as data correlated to classifications and descendant classifications. It is presumed that classifications having large data quantity have a high exhaustivity. For this reason, classification axes having such classifications precisely represent data groups and are deemed useful in terms of the comprehension of data configurations.

The term "hierarchical distances of classifications" indicates shortest/longest path lengths leading to the common ancestor or shortest/longest path lengths leading to the common descendant. In this case, classifications having long hierarchical distances can be regarded as semantically independent classifications.

When selecting classifications based on the aforementioned standard, the classification axis candidate reduction means 1021 selects classifications, satisfying a condition that data quantities of classifications are larger that a predetermined value or fall within an upper range in a descending order of data quantities and a condition that hierarchical distances of classifications are longer than a predetermined value or fall within a certain range, as well as descendant classifications.

In the present embodiment, the constituent elements other than the classification axis candidate reduction means 1021 are functionally similar to those of the second embodiment.

Figure 13:
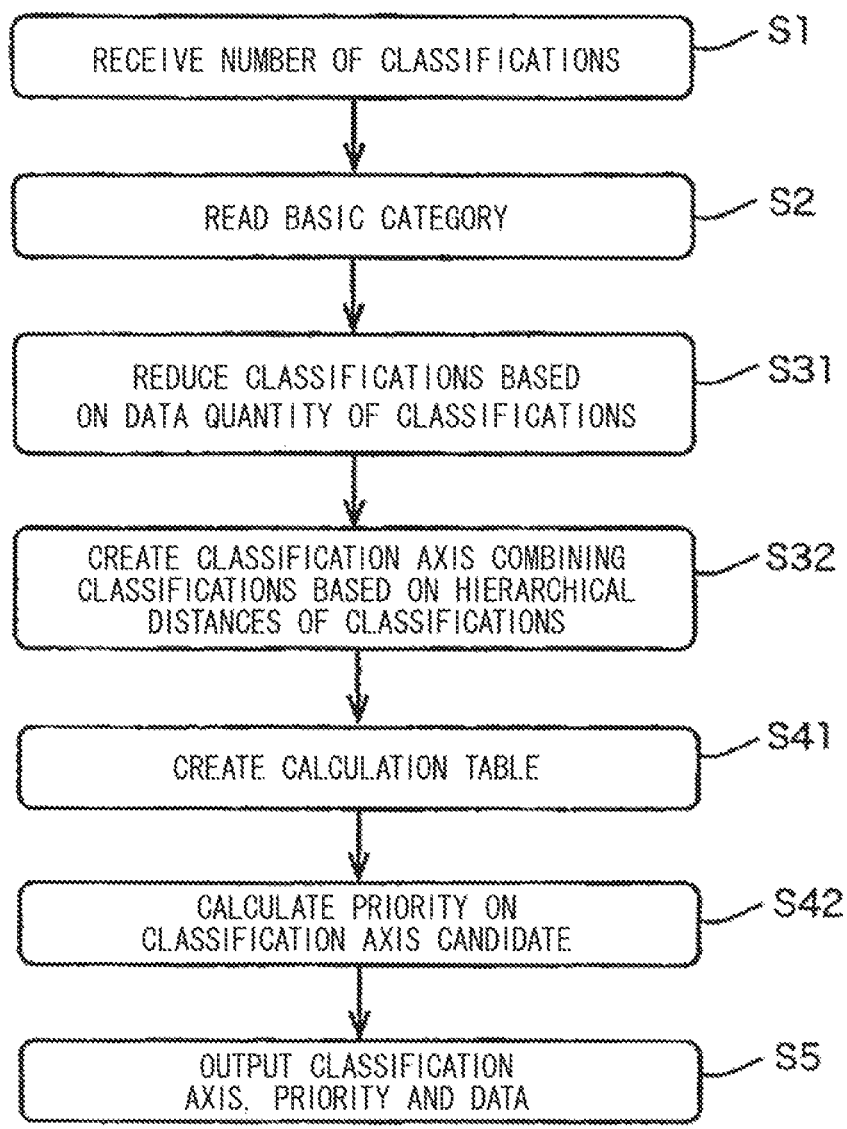
FIG. 13 A flowchart showing an example of a data classification process performed by the data classifier system of the third embodiment.

Next, the operation will be described. FIG. 13 is a flowchart showing an example of a data classifier process performed by the data classifier system of the third embodiment. As shown in FIG. 13, the preset embodiment differs from the second embodiment in that the present embodiment performs step S31 for reducing the number of classifications based on data quantity of classifications and step S32 for reducing the amount of combinations of classifications based on hierarchical distances of classifications instead of step S3 for creating classification axes each combining classifications among descendant classifications of each basic category. The following description basically refers to the difference compared to the second embodiment.

First, similar to the processing of the second embodiment, the data input means 101 receives the number N of classifications upon user's operation (step S1). For instance, the input means 101 inputs N=3 as the number of classifications. Next, similar to the processing of the second embodiment, the classification axis candidate reduction means 1021 obtains (extracts) a basic category regarding classification axes from the basic category accumulation unit 202 (step S2). In an example of FIG. 3, for example, the classification axis candidate reduction means 1021 extracts pieces of information such as "society", "nature" and "culture" from the basic category accumulation unit 202.

Next, the classification axis candidate reduction means 1021 reduces the number of classifications based on data quantity of classifications with reference to the information stored in the classified hierarchy accumulation unit 201 and the information stored in the data accumulation unit 202 (step S31).

In the present embodiment, "data quantity of classifications" is regarded as the number of data correlated to classifications and descendant classifications. When reducing the number of classifications, the classification axis candidate reduction means 1021 limit classifications into classifications whose data quantities are higher than a predetermined value or fall within an upper range in a descending order of data quantities and their descendant classifications.

For instance, the following description refers to the situation in which the classified hierarchy accumulation unit 201 stores the information of FIG. 2 whilst the data accumulation unit 203 stores the information of FIG. 4. In addition, classifications are limited to classifications whose data quantities are two or more or fall within an upper range of 50% in a descending order of data quantities. Furthermore, it is presupposed that all descendant classifications of the classification "society" have been described in the information stored in the classified hierarchy accumulation unit 201. In this case, the classification axis candidate reduction means 1021 counts the number of data correlated to the classification "living" as four, i.e. "d1", "d2", "d3" and "d4" totaling the number of data and other data correlated to descendant classifications "family", "home" and "health care". Thus, FIG. 14 shows the results which are rearranged in a descending order of data quantity by the classification axis candidate reduction means 1021.

Figures 14, 15:
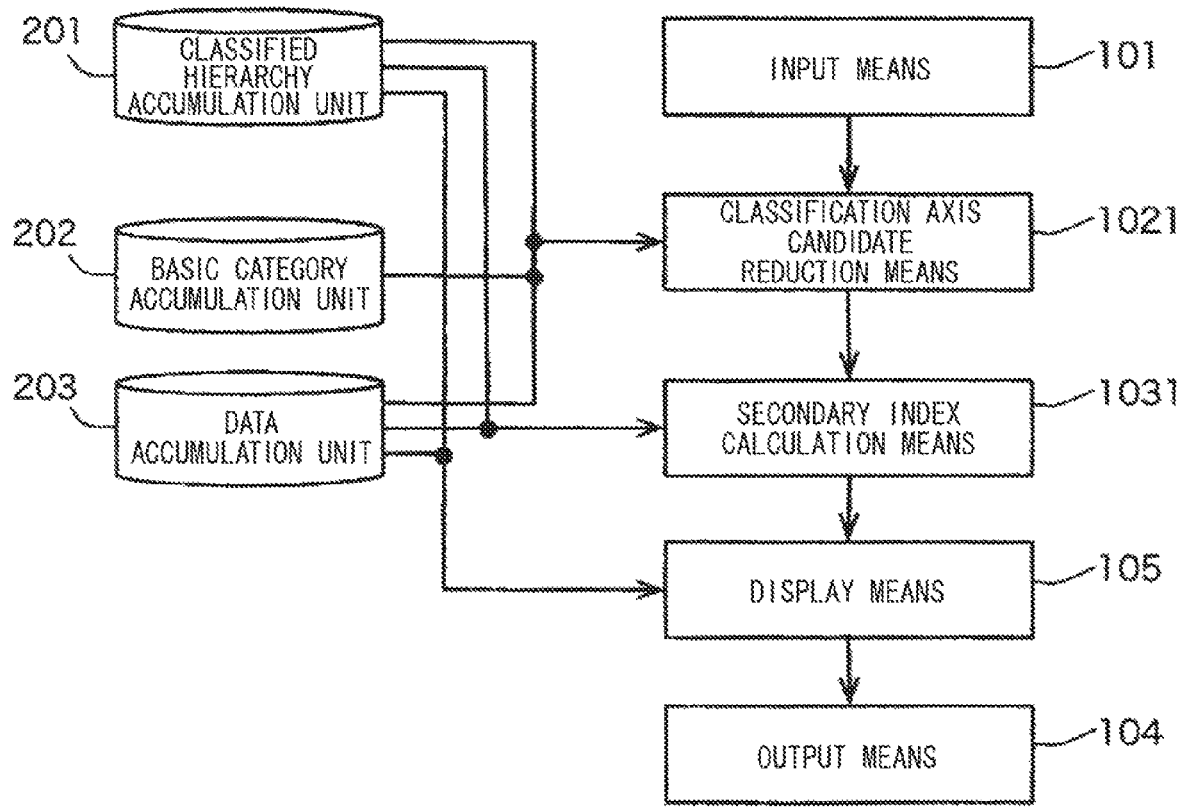
FIG. 14 An illustration showing an example of a calculation process of a classification axis candidate reduction means.
FIG. 15 A block diagram showing an example of the constitution of a data classifier system according to a fourth embodiment.

As shown in FIG. 14, classifications whose data quantities are two or more or fall within an upper range of 50% in a descending order of data quantities are specified as classifications "living", "medical care", "family", "home" and "medicine" whose places are not below the fifth place. These classifications have large amounts of data; hence, they have a possibility of being divided into descendant classifications. Therefore, the classification axis candidate reduction means 1021 may additionally list descendant classifications, i.e. classifications "transplant" and "health care". This example additionally lists descendant classifications, but it is not necessary to additionally list descendant classifications.

Upon executing step S31, it is possible to preclude classifications having small data quantity. In the aforementioned example, it is possible to preclude the classification "politics" and its descendant classifications.

Next, the classification axis candidate reduction means 1021 creates classification axes combining classifications based on hierarchical distances of classifications with reference to the information stored in the classified hierarchy accumulation unit 201 (step S32). In the present embodiment, the classification axis candidate reduction means 1021 uses lengths for ancestor classifications commonly shared among classifications as hierarchical distances of classifications. Based on classifications limited in step S31 and descendant classifications, the classification axis candidate reduction means 1021 creates classification axes each including one or more classifications in which hierarchical distances are longer than a predetermined value. Herein, classification axes do not contain classifications placed in the ancestor-descendant relationship.

For instance, the classification axis candidate reduction means 1021 creates classification axes using classifications whose hierarchical distances are three or more among previously limited classifications of "living", "medical care", "family", "home", "medicine", "transplant" and "health care". In the present embodiment, the classification "medicine" has a hierarchical distance of three or more counted from the classification "living". Therefore, the classification axis candidate reduction means 1021 creates a classification axe by use of either the classifications "living" and "medicine" or other previously limited classifications. In this case, the classification axis candidate reduction means 1021 selects processed classifications from among the two classifications of "living" and "medicine" and other classifications which are not placed in the ancestor-descendant relationship. In this example, the classification axis candidate reduction means 1021 creates a classification axis (society: living, medicine, transplant).

Similarly, classifications "home", "family" and "health care" have hierarchical distances of three or more counted from the classification "medical care". Therefore, the classification axis candidate reduction means 1021 creates classification axes (society: medical care, home, family), (society: medical care, home, health care) and (society: medical care, family, health care).

In this example, the classification axis candidate reduction means 1021 is designed to create classifications such that one of classifications on each classification axis satisfies a condition regarding hierarchical distances, whereas it is possible to create classifications all of which satisfy the condition regarding hierarchical distances.

As described above, upon executing step S32, it is possible to preclude classifications which do not retain semantic independences. In the aforementioned example, the classification axis candidate reduction means 1021 creates classification axes while precluding the classification axis (society: family, home, health care).

Processes following step S41 are similar to those of the second embodiment.

As described above, the present embodiment creates classification axis candidates by selecting a plurality of classifications from among descendant classifications of each basic category. In addition, the present embodiment limits the number of classification axis candidate subjected to calculations based on data quantity of classifications and hierarchical distances of classifications. Then, the present embodiment calculates priorities on the limited number of classification axis candidates. Since priority calculations are performed on the limited number of classification axis candidates alone, it is possible to reduce the overall time for calculating priorities on classification axes. Therefore, upon being provided with the classified hierarchy and data groups correlated to classifications, it is possible to reduce the overall time for calculating priorities on classification axes.

Fourth Embodiment

Next, a fourth embodiment of the present invention will be described. FIG. 15 is a block diagram showing an example of the constitution of a data classifier system according to the fourth embodiment. As shown in FIG. 15, the present embodiment differs from the third embodiment in that the data classifier system includes a display means 105 in addition to the constituent elements shown in FIG. 12.

Specifically, the display means 105 is configured of a CPU of an information processing device which operates according to programs and a display device such as a display. The display means 105 has a function of outputting (displaying) classification axes, priority and data calculated by the secondary index calculation means 1031 to a display device such as a display. For instance, the display means 105 outputs (displays) the amount of data allocated to each classification on each classification axis, data and attributes in a list form or a table form.

Figure 16:
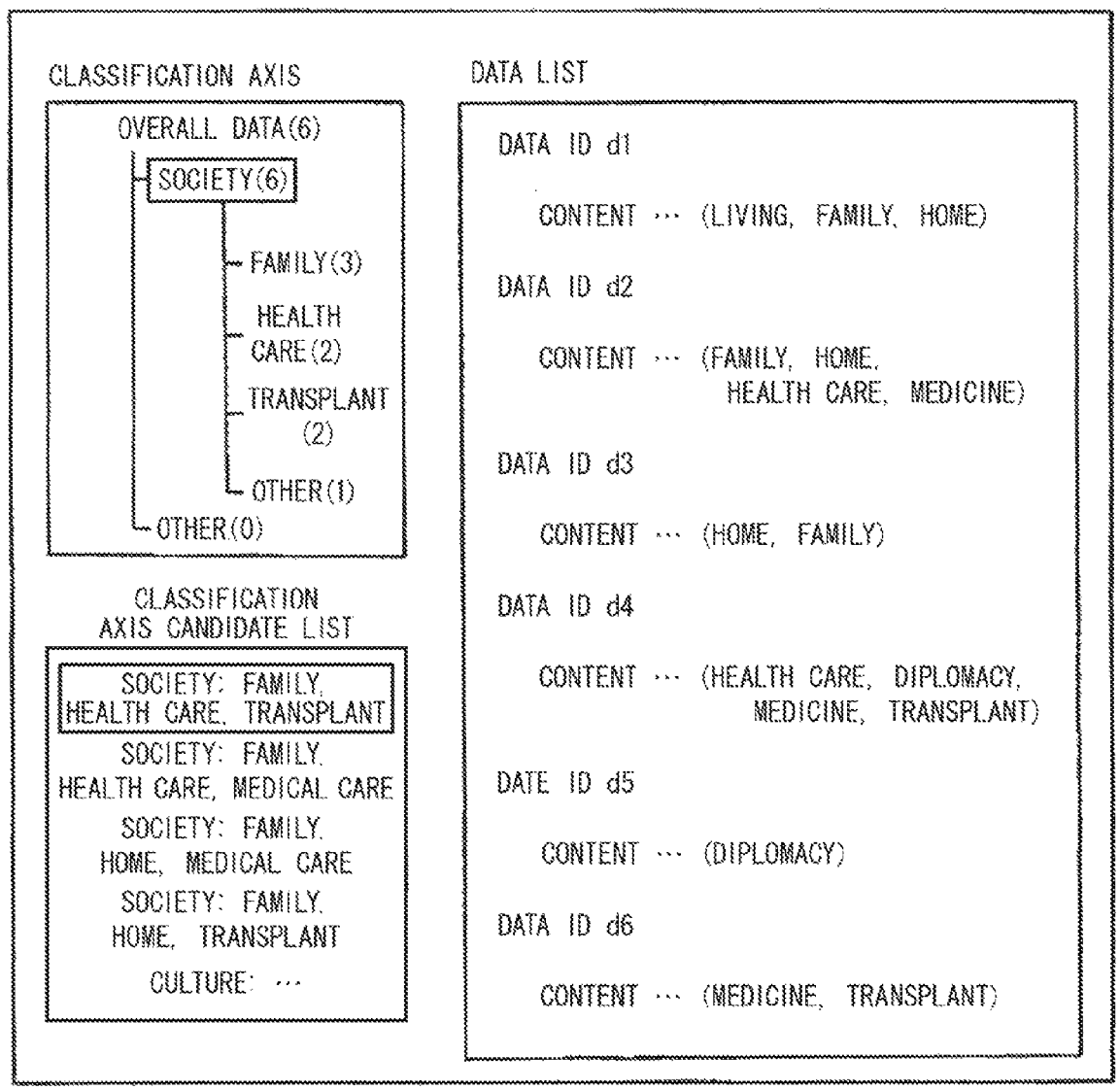
FIG. 16 An illustration showing an example of information which a display means displays in list form.

First, the operation of the display means 105 displaying the information in a list form will be described. FIG. 16 shows an example of the information which the display means 105 displays in a list form. As shown in FIG. 16, the display means 105 displays a screen image including display areas representing a classification axis, a classification axis candidate list and a data list. As the classification axis, the display means 105 displays a classification axis having the highest priority or a classification axis selected from among the classification axis candidate list. In addition, the display means 105 displays basic categories and classifications each followed by the amount of data.

FIG. 16 shows an example using a classification axis (society: family, health care, transplant). In this case, the display means 105 obtains (extracts) the amount of data allocated to each classification from the data accumulation unit 203.

In an example of FIG. 16, a column indicative of an item "other" is newly added to the screen image displayed on the display means 105. The column of "other" below "society" is connected with the basic category of "society" but is defined as a classification which differs from classifications of "family", "health care" and "transplant". The column of "other" juxtaposed with the basic category of "society" is defined as a classification irrelevant to the basic category of "society". In this connection, the display means 105 is able to obtain the amount of data allocated to the column of "other" with reference to the data accumulation unit 203. As the amount of data, the present embodiment further includes the amount of data correlated to descendant classifications.

In an example of FIG. 16, the display means 105 displays classification axes, whose priorities have been calculated, in an order of priorities in the classification axis candidate list. The display means 105 is able to obtain these classification axes based on the calculation result of the secondary index calculation means 1031.

In an example of FIG. 16, the display means 105 displays various data in the data list. In this case, the display means 105 displays those data correlated with data IDs, detailed content and counterpart classifications. The display means 105 is able to obtain information regarding displayed data with reference to the information stored in the data accumulation unit 203.

In the present embodiment, the functions of the constituent elements other than the display means 105 are equivalent to the functions of the counterpart constituent elements described in the third embodiment.

Next, the operation of the display means 105 for displaying information in a list form will be described. As an initial rendition, the display means 105 displays a classification axis having the highest priority in the classification axis display area. In addition, the display means 105 displays other classification axis candidates in the classification axis candidate list in an order of priorities. Furthermore, the display means 105 displays all data accumulated in the data accumulation unit 203 in the data list.

Next, when an operation is made to select any one of classifications or basic categories from among classification axes displayed in the classification axis display area, the display means 105 displays the corresponding data in the data list. When an operation is made to select any one of classification axis candidates displayed in the area displaying the classification axis candidate list, the display means 105 changes the information of the counterpart classification axis display portion with the selected classification axis.

Figure 17:
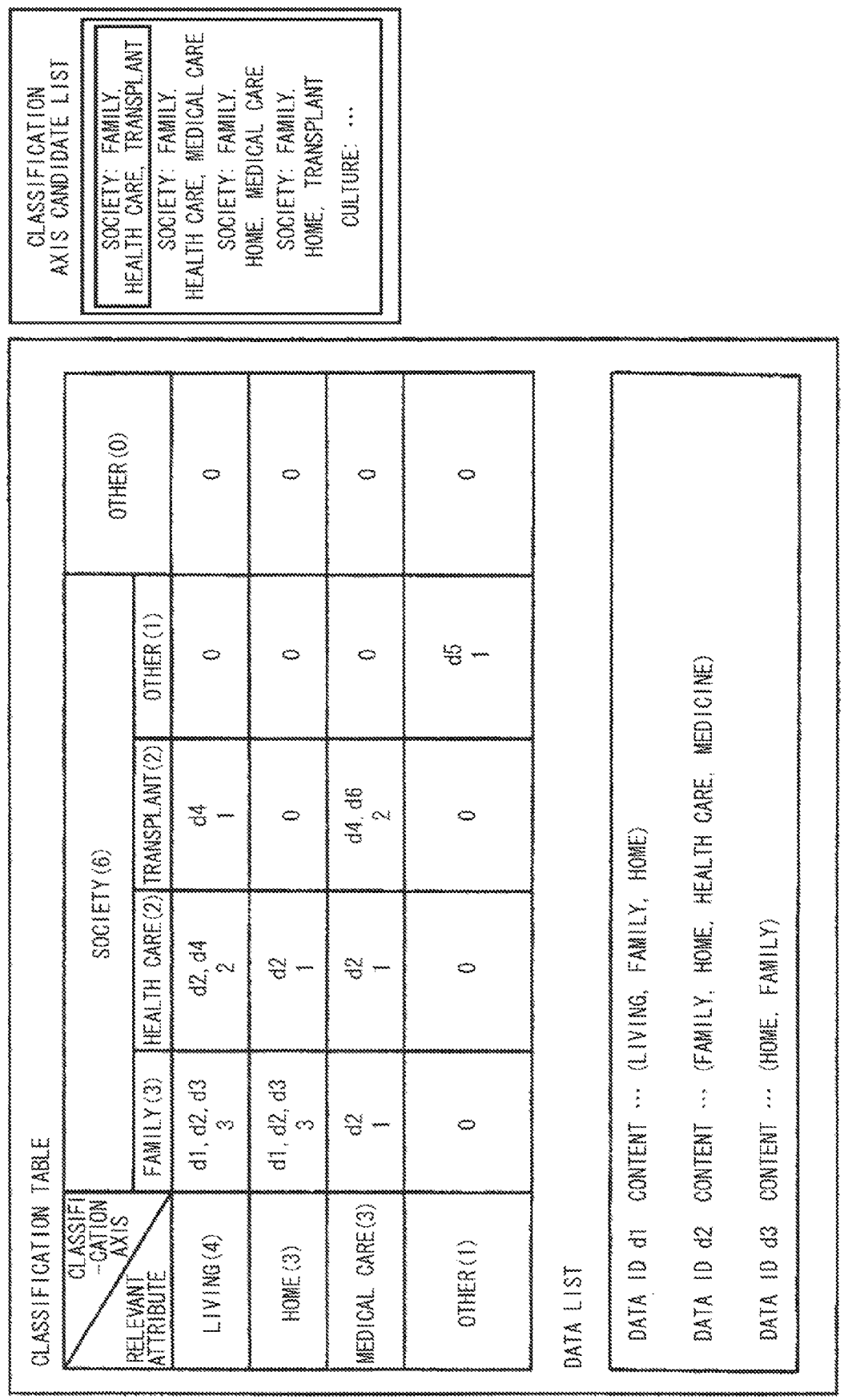
FIG. 17 An illustration showing an example of information which the display means displays in table form.

Next, the operation of the display means 105 for displaying information in a table form will be described. FIG. 17 shows an example of the information which the display means 105 displays in a table form. As shown in FIG. 17, display means 105 renders various areas including a classification table, a data list and a classification axis candidate list on the screen image.

The display means 105 displays a classification axis having the highest priority among classification axis candidates on the horizontal axis of the classification table. In addition, the display means 105 displays relevant attributes on the vertical axis. In the present embodiment, the display means 105 displays classifications as attributes. This example is illustrative; hence, the display means 105 can display creators of data as attributes. A plurality of attributes can be each selected and displayed by way of the user's operation. The display means 105 displays the information showing what kind of data exists in each cell of the table. In the present embodiment, the display means 105 displays data IDs and the amounts of data.

Next, the horizontal axis of "other" will be described. In the classification table shown in FIG. 17, "other" below the basic category of "society" is defined as a classification showing data groups which are not correlated to classifications on each classification axis below the basic category. In FIG. 17, "other" at the rightmost position is defined as a classification showing data groups which are not correlated to the basic category of "society". An item of "other" on the vertical axis shows data groups, which are not correlated to the displayed ones among relevant attributes.

Hereinafter, a procedure for displaying attributes relevant to the vertical axis will be described. First, the display means 105 obtains (extracts) data groups correlated to classification axes with reference to the information stored in the classified hierarchy accumulation unit 201 and the information stored in the data accumulation unit 203. Next, the display means 105 checks (obtains) data quantities relevant to each attribute with reference to the obtained (extracted) attributes of data groups. The display means 105 displays data quantities, the number of which corresponds to the number of classifications on each classification axis, on the vertical axis in an order counting from the largest data quantity.

In the present embodiment, the display means 105 identifies classifications below the basic category as attributes so as to obtain (calculate) data quantities allocated to those classifications. The display means 105 further displays the information representing classification axes other than the already displayed one. Specifically, a classification axis (society: family, health care, transplant) is correlated to data "d1", "d2", "d3", "d4" and "d6". As the classifications having large data quantities, which are correlated to these data but not allocated to the classification axis, the classification of "living" embraces four items ("d1", "d2", "d3" and "d4"); the classification of "home" embraces three items ("d1", "d2" and "d3"); the classification of "medical care" embraces three items ("d2", "d4" and "d6"); and the classification of "medicine" embraces three items ("d2", "d4" and "d6").

In the above case, the display means 105 selects the classifications, each having three items, in an order of ones having larger data quantity. The display means 105 selects and displays either one of classifications both having the same data quantity. This example is illustrative; hence, the display means 105 does not necessarily select classifications as attributes but can select and display other information. For instance, the display means 105 can select and display any attributes ascribed to data upon the user's operation. The display means 105 can automatically select and determine attributes according to the above procedure; alternatively, attributes can be selected upon the user's operation. In FIG. 17, the number of attributes displayed on the vertical axis is not necessarily equal to the number of classification axes.

When any one of cells of the classification table is selected, the display means 105 displays a data list corresponding to the selected cell. In the present embodiment, the display means 105 displays the data ID, the content and the classification. The display means 105 displays these pieces of information with reference to the information stored in the data accumulation unit 203.

The display means 105 displays classification axes, whose priorities have been calculated, in the classification axis candidate list in an order of priorities. The display means 105 is able to obtain these pieces of information based on the calculation result of the secondary index calculation means 1031.

Next, the operation of the display means 105 for displaying information in a table form will be described. As an initial rendition, the display means 105 displays a classification axis having the highest priority on the horizontal axis of the classification table. In this case, the display means 105 further displays relevant attributes constituting the vertical axis in accordance with the foregoing method. In this connection, the display means 105 does not display any data in the data list.

Next, when any one of cells in the classification table is selected upon the user's operation, the display means 105 displays data corresponding to the selected cell in the data list.

Next, when any one of classification axes in the classification axis candidate list is selected upon the user's operation, the display means 105 displays the selected classification axis serving as the horizontal axis. In this case, the display means 105 newly displays relevant attributes on the vertical axis of the classification table.

According to the present embodiment described above, the classification axis, priority and data produced by the secondary index calculation means 1031 are displayed in a list form or in a table form. This allows users to visually recognize the selected status of classification axes, priority and data.

Fifth Embodiment

Figure 18:
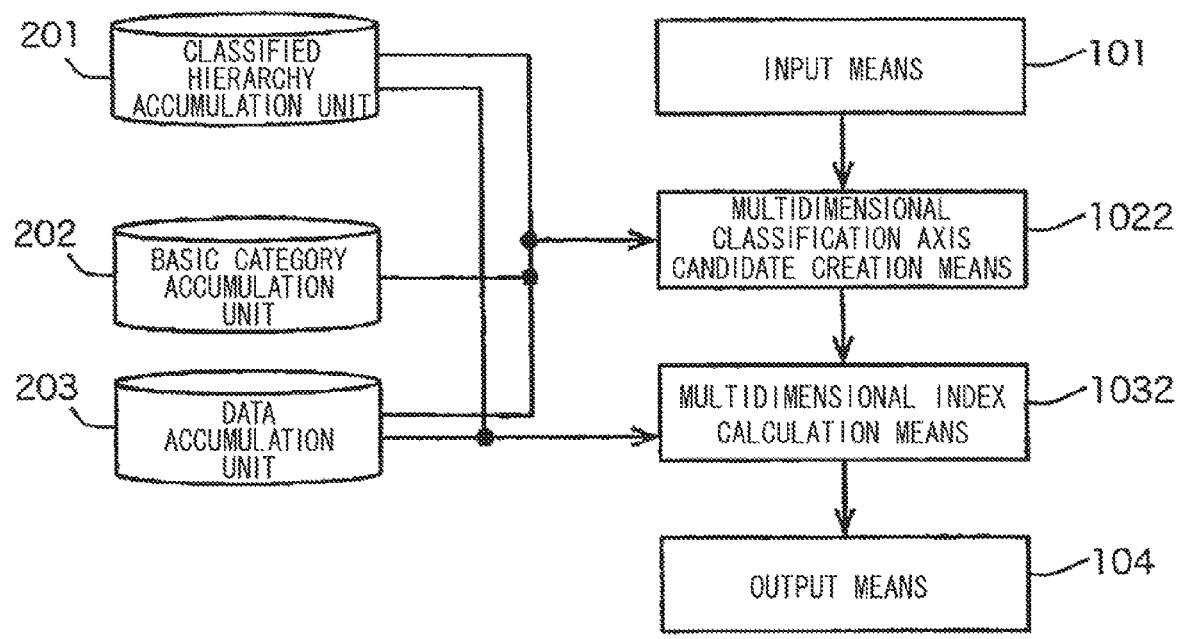
FIG. 18 A block diagram showing an example of the constitution of a data classifier system according to a fifth embodiment.

Next, a fifth embodiment of the present invention will be described. FIG. 18 is a block diagram showing an example of the constitution of a data classifier system according to the fifth embodiment. As shown in FIG. 18, the present embodiment differs from the first embodiment in that the data classifier system includes a multidimensional classification axis candidate creation means 1022 instead of the classification axis candidate creation means 102 and includes a multidimensional index calculation means 1032 instead of the index calculation means 103.

Specifically, the multidimensional classification axis candidate creation means 1022 is configured of a CPU of an information processing device which operates according to programs. The multidimensional classification axis candidate creation means 1022 implements functions of receiving (inputting) the number N of classifications from the input means 101 and creating a plurality of classification axis candidates with reference to the information stored in the classified hierarchy accumulation means 201, the information stored in the basic category accumulation means 202 and the information stored in the data accumulation means 203. In this connection, the number of classifications (hereinafter, referred to as the number of dimensions) can be set to the system in advance (e.g. preset values can be stored in a storage unit such as a memory in advance); alternatively, they can be input upon the user's operation.

When the number of dimensions is two, for example, the multidimensional classification axis candidate creation means 1022 creates multidimensional classification axis candidates each combining two classification axes. In this case, the multidimensional classification axis candidate creation means 1022 creates a multidimensional classification axis (society: home, family, health care)–(society: diplomacy, medicine, transplant) or the like.

Hereinafter, each multidimensional classification axes created by the multidimensional classification axis candidate creation means 1022 will be expressed using a notation of (basic category: N classifications)–(basic category: N classifications). With respect to multidimensional classification axes each having three dimensions or more, the above notation is followed by new classification axes with a symbol of "–" therebetween, thus expressing multidimensional classification axes. In this case, each of classification axes connected with a symbol of "−" therebetween denotes a classification in each dimension. In the case of the multidimensional classification axis (society: home, family, health care)−(society: diplomacy, medicine, transplant), for example, the first classification axis (society: home, family, health care) designates a first-dimensional classification axis whilst the second classification axis (society: diplomacy, medicine, transplant) designates a second-dimensional classification axis.

Specifically, the multidimensional index calculation means 1032 is configured of a CPU of an information processing device which operates according to programs. When creating multidimensional axis candidates, the multidimensional index calculation means 1032 implements a function of creating classifications based on classifications whose data quantities are larger than a predetermined value in accordance with the same procedures as the first embodiment. In this case, it is preferable that the multidimensional index calculation means 1032 create classifications not embracing classifications placed in the ancestor-descendant relationship. Furthermore, it is preferable that the multidimensional index calculation means 1032 do not create classifications in which a classification axis of a certain dimension is completely identical to a classification axis of another dimension.

In addition, the multidimensional index calculation means 1032 implements functions of receiving (inputting) multidimensional classification axis candidates from the multidimensional classification axis creation means 1022 and calculating priorities on classification axis candidates with reference to the information stored in the classified hierarchy accumulation unit 201 and the information stored in the data accumulation unit 203. In this case, the multidimensional index calculation means 1032 calculates priorities based on hierarchical distances of classifications in the classified hierarchy.

The term "hierarchical distances of classifications" represents shortest/longest path lengths leading to common ancestors or shortest/longest path lengths leading to common descendants. As priority, the multidimensional index calculation means 1032 calculates average values or maximum/minimum values of hierarchical distances of classifications on classification axes.

In the present embodiment, the multidimensional index calculation means 1032 employs shortest path lengths leading to common ancestors as "hierarchical distances of classifications" so as to calculate average values of hierarchical distances as priority. This is because classifications having longer hierarchical distances can be regarded as semantically independent ones. In addition, the multidimensional index calculation means 1032 calculates priority based on hierarchical distances of basic categories on classification axes in addition to hierarchical distances of classifications on classification axes.

In the present embodiment, the constituent elements other than the multidimensional classification axis candidate creation means 1022 and the multidimensional index calculation means 1032 are equivalent to the counterpart constituent elements described in the first embodiment.

Figure 19:
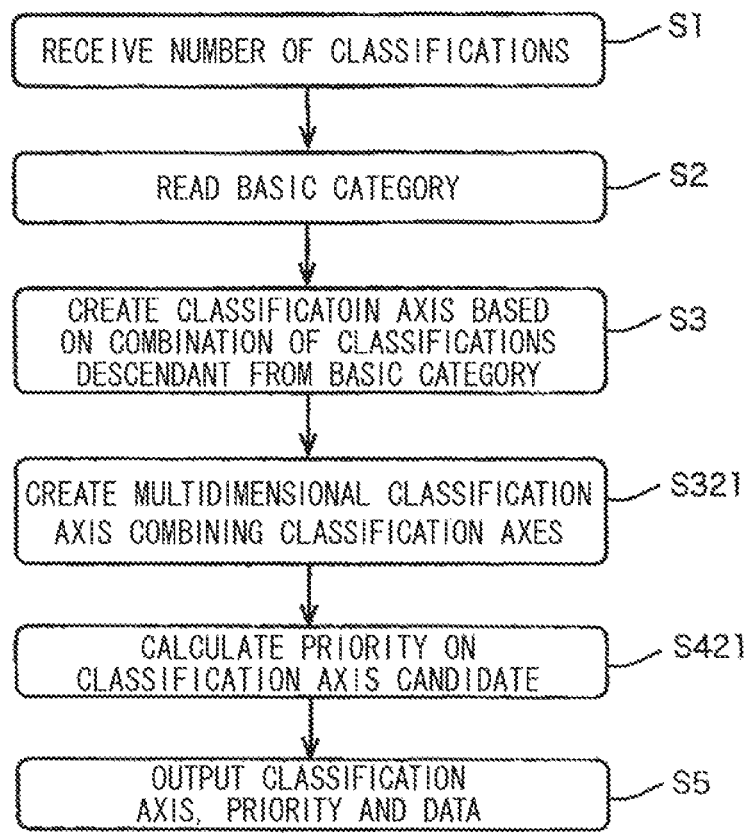
FIG. 19 A flowchart showing an example of a data classification process performed by the data classifier system of the fifth embodiment.

Next, the operation will be described. FIG. 19 is a flowchart showing a data classification process performed by the data classifier system of the fifth embodiment.

First, similar to the foregoing process described in the first embodiment, the input means 101 of the data classifier system receives the number of classifications N upon the user's operation (step S1). For instance, the input means 101 inputs N=3 as the number of classifications. Next, similar to the foregoing process described in the first embodiment, the multidimensional classification axis candidate reduction means 1022 obtains (extracts) basic categories of classification axes from the basic category accumulation unit 202 (step S2). In an example of FIG. 3, the multidimensional classification axis candidate reduction means 1022 extracts the information representative of "society", "nature" and "culture" from the basic category accumulation unit 202.

Next, similar to the processing of the first embodiment, the multidimensional classification axis creation means 1022 obtains (extracts) classifications each correlated to a specific number or more of data among descendant classifications of each basic category with reference to the information stored in the classified hierarchy accumulation unit 201 and the information stored in the data accumulation unit 203. The multidimensional classification axis candidate creation means 1022 creates classification axis candidates each combining the predetermined number of classifications (step S3). Herein, the multidimensional classification axis candidate creation means 1022 does not use classifications placed in the ancestor-descendant relationship as ones used for creating classification axis candidates.

Next, the multidimensional classification axis candidate creation means 1022 creates multidimensional classification axes each combining classification axes, the number of which corresponds to the number of dimensions (step S321). In this connection, the number of dimensions used for creating multidimensional classification axes can be set to the system in advance (e.g. preset values can be stored in a storage device such as a memory in advance); alternatively, it can be input upon user's operation. When the number of dimensions is two, for example, the multidimensional classification axis candidate creation means 1022 creates a multidimensional classification axis (society: home, family, health care)−(society: diplomacy, medicine, transplant) or the like.

Next, the multidimensional index calculation means 1032 obtains (inputs) multidimensional classification axis candidates from the multidimensional classification axis candidate creation means 1022 so as to calculate priority on each multidimensional classification axis with reference to the information stored in the classified hierarchy accumulation unit 201 (step S421).

For the purpose of securing an independence of semantics in priority calculation, the multidimensional index calculation means 1032 calculates average values of hierarchical distances of classifications and average values of hierarchical distances of basic categories. Herein, "hierarchical distances of classifications" or "hierarchical distances of basic categories" represent shortest paths of classifications leading to ancestor classifications. The multidimensional index calculation means 1032 calculate priority according to Equations (24) and (25).

$$\text{Multidimensional Priority}((X1:C1)-(X2:C2)- \ldots )=1/\text{number of dimensions} \times \Sigma \text{Independence}(Xi:Ci)+1/(2 \times \text{number of dimensions}) \times \Sigma \text{ComDist}(Xi, Xj) \quad (24)$$

$$\text{Independent}(X:C)=1/\text{Max}(X) \times 1/(2 \times \text{number of combinations}) \times \Sigma \text{ComDist}(ci,cj) \quad (25)$$

In Equation (24), $X1, X2, \ldots, Xi$ denote basic categories in a dimension i. In addition, $C1, C2, Ci$ denote classifications in a dimension i. In this connection, $\text{Max}(X)$ and $\text{ComDist}(ci,cj)$ are equivalent to the foregoing ones described in the first embodiment. According to Equation (24), the multidimensional index calculation means 1032 calculates an average value by dividing the independence (i.e. a hierarchical distance between classifications), which is calculated in the first term with respect to each dimension, by the number of dimensions. In addition, the multidimensional index calculation means 1032 calculates an average value of hierarchical distances of basic categories in the second term.

For instance, the multidimensional index calculation means 1032 calculates priority on the multidimensional classification axis (society: home, family, health care)–(society: diplomacy, medicine, transplant) according to Equation (26). In this case, the number of combinations is set to three because of the number of classifications N=-3, whilst the number of dimensions is set to two. The deepest classification among classifications descendant from the basic category of "society" is 2 in the classified hierarchy shown in FIG. 2.

$$\begin{aligned}\text{Priority}((\text{society: home, family, health care})-(\text{society: }\\\text{diplomacy, medicine, transplant}))=\tfrac{1}{2}(\tfrac{1}{2}\times\tfrac{1}{6}\times\\(\text{ComDist}(\text{home, family})+\text{ComDist}(\text{home, }\\\text{healthcare})+\text{ComDist}(\text{family, health care}))+(\tfrac{1}{2}\times\\\tfrac{1}{6}\times(\text{ComDist}(\text{diplomacy, medicine})+\text{ComDist}\\(\text{diplomacy, transplant})+\text{ComDist}(\text{medicine, }\\\text{transplant}))+\tfrac{1}{4}\times(\text{ComDist}(\text{society, society}))=\tfrac{1}{2}\times\\(\tfrac{1}{2}\times\tfrac{1}{6}\times(2+2+2)+(\tfrac{1}{2}\times\tfrac{1}{6}\times(4+4+2))+\tfrac{1}{4}\times(0)=0.67\end{aligned} \quad (26)$$

In the case of multidimensional classification axes of three dimensions or more, however, the multidimensional index calculation means 1032 is able to calculate multidimensional priority by way of calculations equivalent to the foregoing ones.

According to the above calculations, it is possible to impart a high priority to classification axes including semantically independent classifications in addition to similar classifications. In addition, it is possible to cope with multidimensional classification axes.

Next, the output means 104 outputs classification axes, priority and data based on the calculation result of the multi-dimensional index calculation means 1032 (step S5). FIG. 20(A), FIG. 20(B) and FIG. 20(C) show examples of the information output from the output means 104 of the fifth embodiment. In examples of FIG. 20(A), FIG. 20(B) and FIG. 20(C), the output means 104 outputs three tables. In the illustrations, " . . . " denotes an omission mark.

For instance, the output means 104 outputs a table of FIG. 20(A) including records correlated with the dimensional ID, the classification axis ID and the score. That is, the table of FIG. 20(A) describes classification axes and their scores per each multidimensional classification axis candidate. In an example of FIG. 20(A), classification axis IDs are each described with a delimiter of "," therebetween. Since the number of dimensions is set to two in the present embodiment, classification axis IDs include two classification axis IDs. In the case of multidimensional classification axes of three dimensions or more, it is possible to cope with multiple dimensions by increasing the number of classification axis IDs.

In addition, the output means 104 outputs a table of FIG. 20(B) including records correlated with the classification ID, the basic category and the classification. In an example of FIG. 20(B), one row represents one classification axis.

Furthermore, the output means 104 outputs a table of FIG. 20(C) including records correlated with the classification ID, the classification and the data ID. In an example of FIG. 20(C), one record corresponds to classifications on each classification axis. In an example of FIG. 20(C), data IDs are each described with a delimiter of "," therebetween. In the illustration, " . . . " denotes an omission mark.

The output methods of FIG. 20(A), FIG. 20(B) and FIG. 20(C) are illustrative; hence, the output means 104 can outputs a single table combining two tables, or it can additionally output a new table including attribute information of each data.

According to the aforementioned constitution, it is possible to select classification axes based on the semantic independence between classifications. Thus, it is possible to select classification axes comprehensible for users.

As described above, when creating classification axes based on the combination of classifications, assigned to at least one data, among classifications descendant from each basic category, the present embodiment is able to reduce the number of classification axis candidates subjected to calculations based on data quantity of classifications and hierarchical distances of classifications. The present embodiment combines the reduced classification axis candidates so as to create multidimensional classification axis candidates. In addition, the present embodiment calculates priority on multidimensional classification axis candidates based on hierarchical distances of classifications in the classified hierarchy. Therefore, upon receiving data groups correlated to the classified hierarchy and classifications, it is possible to determine priorities of classification axis candidates in light of independences.

Sixth Embodiment

Next, a sixth embodiment of the present invention will be described. FIG. 21 is a block diagram showing an example of the constitution of a data classifier system according to the sixth embodiment. As shown in FIG. 21, the present embodiment differs from the fifth embodiment in that the data classifier system includes a secondary multidimensional index calculation means 1033 instead of the multidimensional index calculation means 1032 shown in FIG. 18.

Specifically, the secondary multidimensional index calculation means 1033 is configured of a CPU of an information processing device which operates according to programs. The secondary multidimensional index calculation means 1033 has functions of receiving (inputting) classification axis candidates from the multidimensional classification axis candidate creation means 1022 and calculating priority on classification axes. In this case, the secondary multidimensional index calculation means 1033 calculates priority based on hierarchical depths of classifications, data quantity of classifications and data redundancy of classifications, or their combinations in addition to hierarchical distances of classifications.

As a priority calculation method, the secondary multidimensional index calculation means 1033 employs a method extending the priority calculation method of the second embodiment in a multidimensional manner, thus calculating priority.

In the present embodiment, the functions of the constituent elements other than the secondary multidimensional index calculation means 1033 are equivalent to the functions of the counterpart constituent elements described in the fifth embodiment.

Next, a priority calculation method will be described in connection with the secondary multidimensional index calculation means 1033 calculating priority. According to the procedure similar to that of the second embodiment, the secondary multidimensional index calculation means 1033 obtains (inputs) multidimensional classification axis candidates from the multidimensional classification axis candidate creation means 1022 so as to create a calculation table with reference to the information stored in the classified hierarchy accumulation unit 201 and the information stored in the data accumulation unit 203. The present embodiment differs from the second embodiment in that the secondary multidimensional index calculation means 1033 creates a calculation table over multiple dimensions.

As the calculation table, the secondary multidimensional index calculation means 1033 creates two tables, namely a classification-specified data quantity table and a data-specified classification number table.

The classification-specified data quantity table is a table counting the amount of data correlated to combinations of classifications in multiple dimensions. The classification-specified data quantity table includes records correlated with combinations of classifications, data quantity and depths of classifications. The data-specified classification number table is a table counting the number of classifications on each classification axis corresponding to each data, wherein it includes data IDs and combinations of classifications. It is preferable that the secondary multidimensional index calculation means 1033 create a temporary calculation table in memory.

FIG. 22(A) and FIG. 22(B) show an example of the classification-specified data quantity table and an example of the data-specified classification number table. Herein, FIG. 22(A) shows an example of the classification-specified data quantity table. FIG. 22(B) shows an example of the data-specified classification number table. In these examples shown in FIG. 22(A) and FIG. 22(B), the secondary multidimensional index calculation means 1033 creates the classification-specified data quantity table and the data-specified classification number table based on a multidimensional classification axis (society: home, family, health care)–(society: diplomacy, medicine, transplant), the information of FIG. 2 stored in the classified hierarchy accumulation unit 201 and the information of FIG. 4 stored in the data accumulation unit 203.

In an example of FIG. 22(A), the classification-specified data quantity table is a table including records correlated with combinations of classifications, data quantity and depths of classifications. For the purpose of simplifying subsequent calculations, the secondary multidimensional index calculation means 1033 of the present embodiment calculates depths of classifications according to Equation (27).

$$\text{Depth}(c_{ij}, c_{kl}, \ldots) = 1/\text{number of dimensions} \times \Sigma(1/\text{Max}(X_i) \times \text{Depth}(X_i, c_{ij})) \quad (27)$$

In Equation (27), $c_{ij}$ denotes classifications i and j, and $c_{lk}$ denotes classifications k and l. Herein, values i and k differ each other. In addition, $X_i$ denotes an i-dimensional basic category. $\text{Max}(X_i)$ denotes a depth of a deepest classification among classifications descendant from the basic category $X_i$. $\text{Depth}(X_i, c_{ij})$ denotes a shortest path length from the i-dimensional basic category to the classification $c_{ij}$. Furthermore, a symbol $\Sigma$ denotes the summation with combinations of classifications in different dimensions. In Equation (27), depths of classifications are defined as average values of depths of classifications among combinations of classifications.

In FIG. 22(A), for example, a first record represents data correlated to a first-dimensional classification of "home" and a second-dimensional classification of "diplomacy". With reference to the information of FIG. 4 stored in the data accumulation unit 203, the data accumulation unit 203 does not store data correlated to these two classifications; hence, the amount of data is zero as shown in FIG. 22(A). As to depths of classifications, two depths exist from society to family; two depths exist from society to medicine; two depths exist in Max($X_i$); and the number of dimensions is two; hence, the depth of the classification is set to 1 as shown in FIG. 22(A).

The data-specified classification number table is a table including records correlated to data IDs and combinations of classifications. FIG. 22(B) shows an example of the data-specified classification number table describing the number of classifications correlated to a multidimensional classification axis (society: home, family, health care)–(society: diplomacy, medicine, transplant) with respect to each data ID. In an example of FIG. 22(B), a data ID "d2" is correlated to the first-dimensional classification of "health care" and the second-dimensional classification of "medicine" with reference to the information of FIG. 4 stored in the data accumulation unit 203; hence, the number of classifications is set to 1.

Next, the secondary multidimensional index calculation means 1033 calculates priority on classification axes by use of the calculation table. In the present embodiment, the secondary multidimensional index calculation means 1033 calculates the aforementioned independence index, specifics index, exhaustivity index and uniqueness index so as to obtain a linear addition of these indexes with weights, thus calculating the overall priority according to Equation (28).

$$\begin{aligned}&\text{Multidimensional Priority}((X1{:}C1){-}(X2{:}C2){-}\ldots) = W1 \times \text{Multidimensional Independence} \\ &((X1{:}C1){-}(X2{:}C2){-}\ldots) + W2 \times \text{Multidimensional Specifics}((X1{:}C1){-}(X2{:}C2){-}\ldots) + W3 \times \text{Multidimensional Exhaustivity}((X1{:}C1){-}(X2{:}C2){-}\ldots) + W4 \times \text{Multidimensional Uniqueness} \\ &((X1{:}C1){-}(X2{:}C2){-}\ldots)\end{aligned} \quad (28)$$

In Equation (28), X denotes a basic category, and C denotes classifications. In addition, W1, W2, W3 and W4 denote weight coefficients to respective indexes. In this connection, these weight coefficients can be set to the system in advance (e.g. preset values can be stored in a storage unit such as a memory in advance); alternatively, they can be set upon the user's operation. In the present embodiment, these weight coefficients have been set to the system in advance.

The present embodiment is equivalent to the fifth embodiment in terms of the independence index, wherein the secondary multidimensional index calculation means 1033 calculates multidimensional independence indexes according to Equations (29) and (30).

$$\begin{aligned}&\text{Multidimensional Independence}((X1{:}C1){-}(X2{:}C2){-}\ldots) = 1/\text{number of dimensions} \times \Sigma \text{Independence}(X_i{:}C_i) + 1/(2 \times \text{number of dimensions}) \times \\ &\Sigma \text{ComDist}(X_i, X_j)\end{aligned} \quad (29)$$

$$\text{Independence}(X{:}C) = 1/\text{Max}(X) \times 1/(2 \times \text{number of combinations}) \times \Sigma \text{ComDist}(C1, C2) \quad (30)$$

In Equations (29) and (30), X1, X2, $X_i$, C1, C2, $C_i$, Max(X) and ComDist as well as the number of combinations and the number of dimensions are equivalent to those described in the fifth embodiment.

The secondary multidimensional index calculation means 1033 calculates specifics indexes according to the following calculations. In the present embodiment, specifics indexes are average values of path lengths from basic categories to classifications on classification axes. The secondary multidimensional index calculation means 1033 is able to calculate specifics indexes according to Equations (31) and (32) by use of the classification-specified data quantity table.

$$\begin{aligned}&\text{Multidimensional Specifics}((X1{:}C1){-}(X2{:}C2){-}\ldots) = 1/\text{number of dimensions} \times \Sigma \text{Specifics}(X_i{:}C_i)\end{aligned} \quad (31)$$

$$\text{Specifics}(X{:}C) = 1/\text{Max}(X) \times 1/N \times \Sigma \text{Depth}(X, c_j) \quad (32)$$

In Equations (31) and (32), Max(X), N and Depth (X, $c_j$) are equivalent to those described in the second embodiment. As shown in FIG. 22(A), depths of classifications in the classification-specified data quantity table have been already calculated according to 1/number of dimensions×Σ1/Max(Xi)×Depth(Xi,cij); hence, it is possible to calculate multidimensional specifics indexes according to Equation (33).

Multidimensional Specifics$((X1:C1)-(X2:C2)-\ldots)$=1/number of dimensions×1/N×Σ(1/Max(Xi)×Depth(Xi,cij))=1/(N dimensions)×Σ(depths in classification-specified data quantity table) (33)

The secondary multidimensional index calculation means 1033 calculates exhaustivity indexes according to the following calculation. In the present embodiment, the exhaustivity index is a cover ratio to all data correlated to combinations of classifications in each dimension. The secondary multidimensional index calculation means 1033 is able to calculate exhaustivity indexes according to Equation (34) by use of the previously created data-specified classification number table.

Multidimensional Exhaustivity$((X1:C1)-(X2:C2)-\ldots)$=1/DataNum×|U Data(cij,ckl,...)|=1/DataNum×RecNum(data-specified classification number table, number of classifications>0) (34)

In Equation (34), "Data(cij,ckl, . . . )" denotes a set of all data correlated to an i-dimensional j classification cij, a k-dimensional l classification ckl, and classifications of other dimensions. In addition, DataNum denotes the number of data sets. RecNum (data-specified classification number table, number of classifications>0) denotes the number of records each having zero or more classifications in the data-specified classification number table. This RecNum (data-specified classification number table, number of classifications>0) is equivalent to the amount of data correlated to combinations of classifications. Therefore, it is possible to rewrite the foregoing equation as Equation (34).

The secondary multidimensional index calculation means 1033 calculates uniqueness indexes according to the following calculation. In the present embodiment, the uniqueness index is defined as the inverse of the data redundancy. Herein, the data redundancy is a value which is produced by dividing the total quantity of data correlated to combinations of classifications by the total quantity of data having no redundancies. The secondary multidimensional index calculation means 1033 is able to calculate uniqueness indexes according to Equation (35) by use of the previously created classification-specified data quantity table.

Multidimensional Uniqueness$((X1:C1)-(X2:C2)-\ldots)$=|U Data(cij,ckl,...)|/ΣCatNum(cij,clk,...)=RecNum(data-specified classification number table, number of classifications>0)/Σ(data quantity of data-specified classification number table) (35)

In the case of a multidimensional classification axis (society: home, family, health care)–(society: diplomacy, medicine, transplant), for example, the secondary multidimensional index calculation means 1033 calculates the above indexes according to Equations (36) through (39) with reference to the classification-specified data quantity table shown in FIG. 22(A) and the information of FIG. 32 stored in the classified hierarchy accumulation unit 201.

Multidimensional Independence$((X1:C1)-(X2:C2)-\ldots)$=1/number of dimensions×ΣIndependence$(Xi:Ci)$+1/(2×number of dimensions)×ΣComDist$(Xi,Xj)$=½(½×⅙×(ComDist(home, family)+ComDist(home, health care)+ComDist(home, health care))+(½×⅙×(ComDist(diplomacy, medicine)+ComDist(diplomacy, transplant)+ComDist(medicine, transplant))+¼×(ComDist(society, society))=½(½×⅙×(2+2+2)+(½×⅙×(4+4+2))+¼×(0)=0.667 (36)

Multidimensional Specifics$((X1:C1)-(X2:C2)-\ldots)$=1/(N dimensions)×Σ(depths in classification-specified data quantity table)=⅙×(1+1+1+1+1+1+1+1)=1 (37)

Multidimensional Exhaustivity$((X1:C1)-(X2:C2)-\ldots)$=1/DataNum×RecNum(data-specified classification number table, number of classifications>0)=⅙×2=0.333 (38)

Multidimensional Uniqueness$((X1:C1)-(X2:C2)-\ldots)$=RecNum(data-specified classification number table, number of classifications>0)/Σ(amount of data in data-specified classification number table)=2/(0+1+0+2+0+0)=⅔=0.667 (39)

When the same weight coefficient of 0.25 is set to all indexes, the secondary multidimensional index calculation means 1033 is able to calculate priority according to Equation (40).

Priority$(X:C)$=$W1$×Independence$(X:C)$+$W2$×Specifics$(X:C)$+$W3$×Exhaustivity$(X:C)$+$W4$×Uniqueness$(X:C)$=0.25×0.667+0.25×1+0.25×0.333+0.25×0.667=0.67 (40)

As described above, the present embodiment calculates priority based on hierarchical depths of classifications, data quantity of classifications and data redundancy of classifications, or their combinations in addition to hierarchical distances of classifications. Thus, it is possible to determine priorities of multidimensional classification axes effectively considering independences in light of hierarchical depths of classifications, data quantity of classifications and data redundancy of classifications in addition to hierarchical distances of classifications.

Seventh Embodiment

Figure 23:
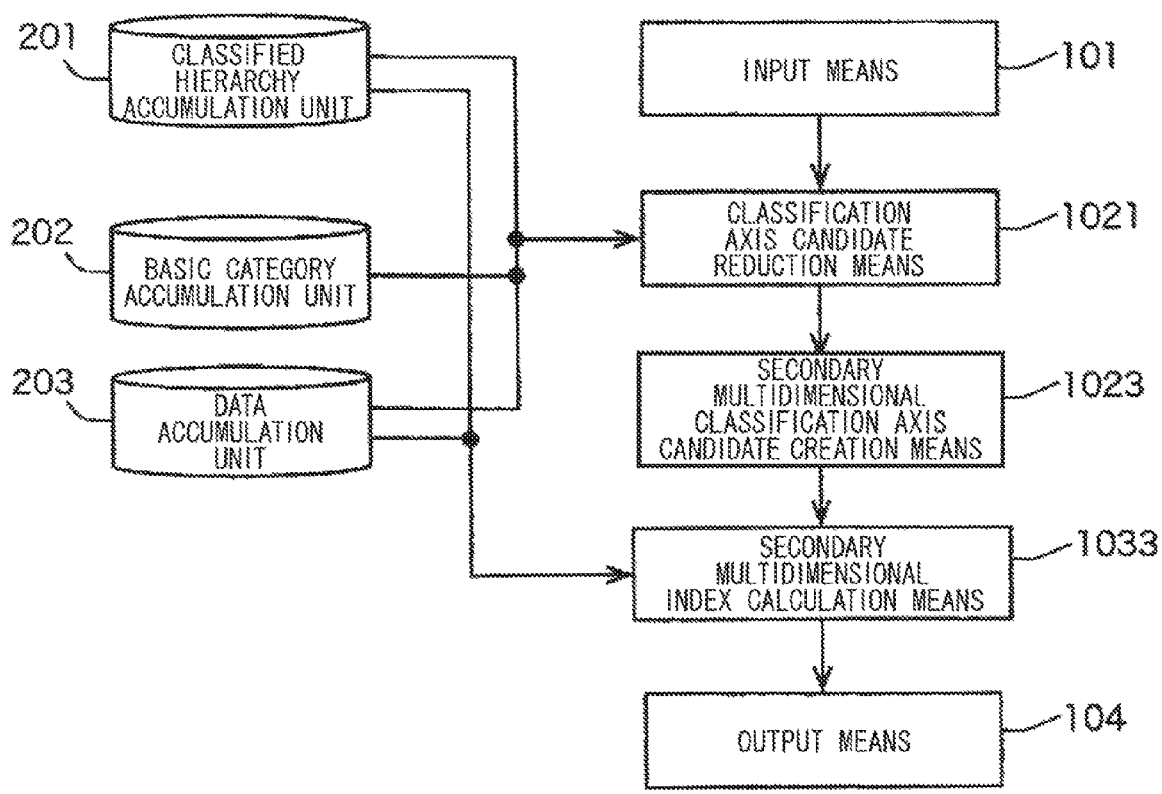
FIG. 23 A block diagram showing an example of the constitution of a data classifier system according to a seventh embodiment.

Next, a seventh embodiment of the present invention will be described. FIG. 23 is a block diagram showing an example of the constitution of a data classifier system according to the seventh embodiment. As shown in FIG. 23, the present embodiment differs from the sixth embodiment in that the data classifier system includes the classification axis candidate reduction means 1021 and the secondary multidimensional classification axis candidate creation means 1023 instead of the multidimensional classification axis candidate creation means 1022.

Similar to the classification axis candidate reduction means 1022 described in the third embodiment, the classification axis candidate reduction means 1021 does not combine all descendant classifications of each basic category but implements a function of reducing the number of classification axes which are created based on data quantities of classifications and hierarchical distances of classifications. Thus, the classification axis candidate reduction means 1021 is able to reduce the number of classification axes sued for calculating priorities, thus achieving a high-speed calculation.

Specifically, the secondary multidimensional classification axis candidate creation means 1023 is configured of a CPU of an information processing device which operates according to programs. The secondary multidimensional classification axis candidate reduction means 1023 implements functions of receiving (inputting) classification axis candidates from the classification axis candidate reduction means 1022 and creating multidimensional classification axes combining a plurality of input classification axis candidates. In this connection, the number of dimensions can be set to the system in advance (e.g. preset values can be stored in a storage device such as a memory in advance; alternatively, it can be input upon user's operation. The secondary index calculation means 1023 has a function of transferring (outputting) the created multidimensional classification axes to the secondary multidimensional index calculation means 1033.

In the present embodiment, the constituent elements other than the classification axis candidate reduction means 1021 and the secondary multidimensional classification axis candidate creation means 1023 are equivalent to the counterpart functions described in the sixth embodiment.

As described above, when creating classification axes based on combinations of classifications each correlated to at least one data allocated to descendant classifications of each basic category, the present embodiment reduces the number of classification axis candidates subjected to calculations based on data quantities of classifications and hierarchical distances of classifications. In addition, the present embodiment creates multidimensional classification axes combining the reduced number of classification axis candidates. Subsequently, the present embodiment calculates priorities of multidimensional classification axis candidates based on hierarchical distances of classifications in the classified hierarchy. Therefore, upon being provided with the classified hierarchy and data groups correlated to classifications, it is possible to reduce the overall time of calculating priorities of multidimensional classification axes as well.

Eighth Embodiment

Figure 24:
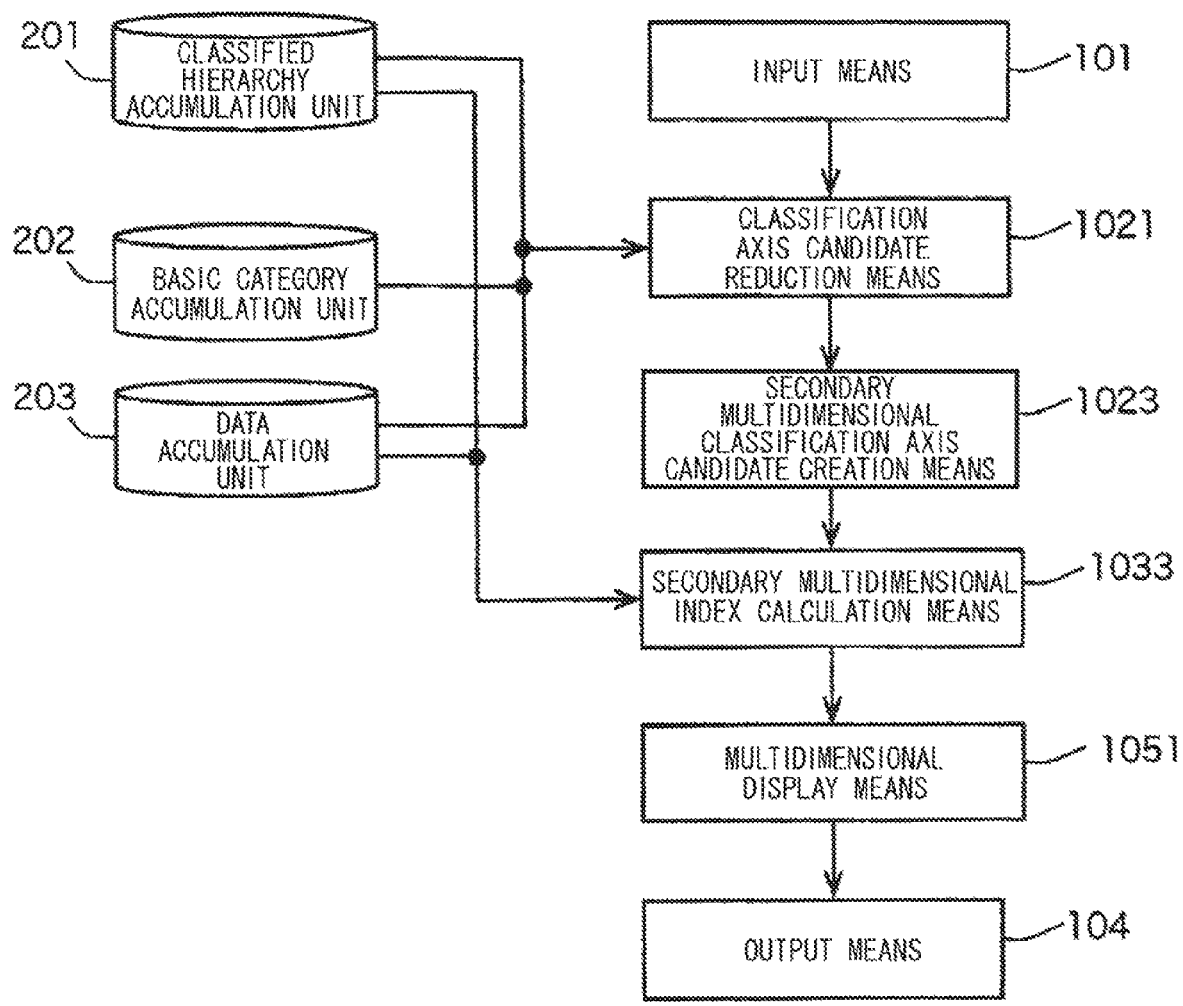
FIG. 24 A block diagram showing an example of the constitution of a data classifier system according to an eighth embodiment.

Next, an eighth embodiment of the present invention will be described. FIG. 24 is a block diagram showing an example of the constitution of a data classifier system according to the eighth embodiment. As shown in FIG. 24, the present embodiment differs from the seventh embodiment in that the data classifier system includes a multidimensional display means 1051 in addition to the constituent elements shown in FIG. 17.

Specifically, the multidimensional display means 1051 is configured of a CPU of an information processing device which operates according to programs and a display device such as a display. The multidimensional display means 1051 has a function of outputting (displaying) classification axes, priority and data, which are determined by the secondary multidimensional index calculation means 1033, to a display device such as a display. For instance, the multidimensional display means 1051 outputs (displays) data quantity of classifications allocated to a classification axis of each dimension, data and attributes in a list form or in a table form.

Figure 25:
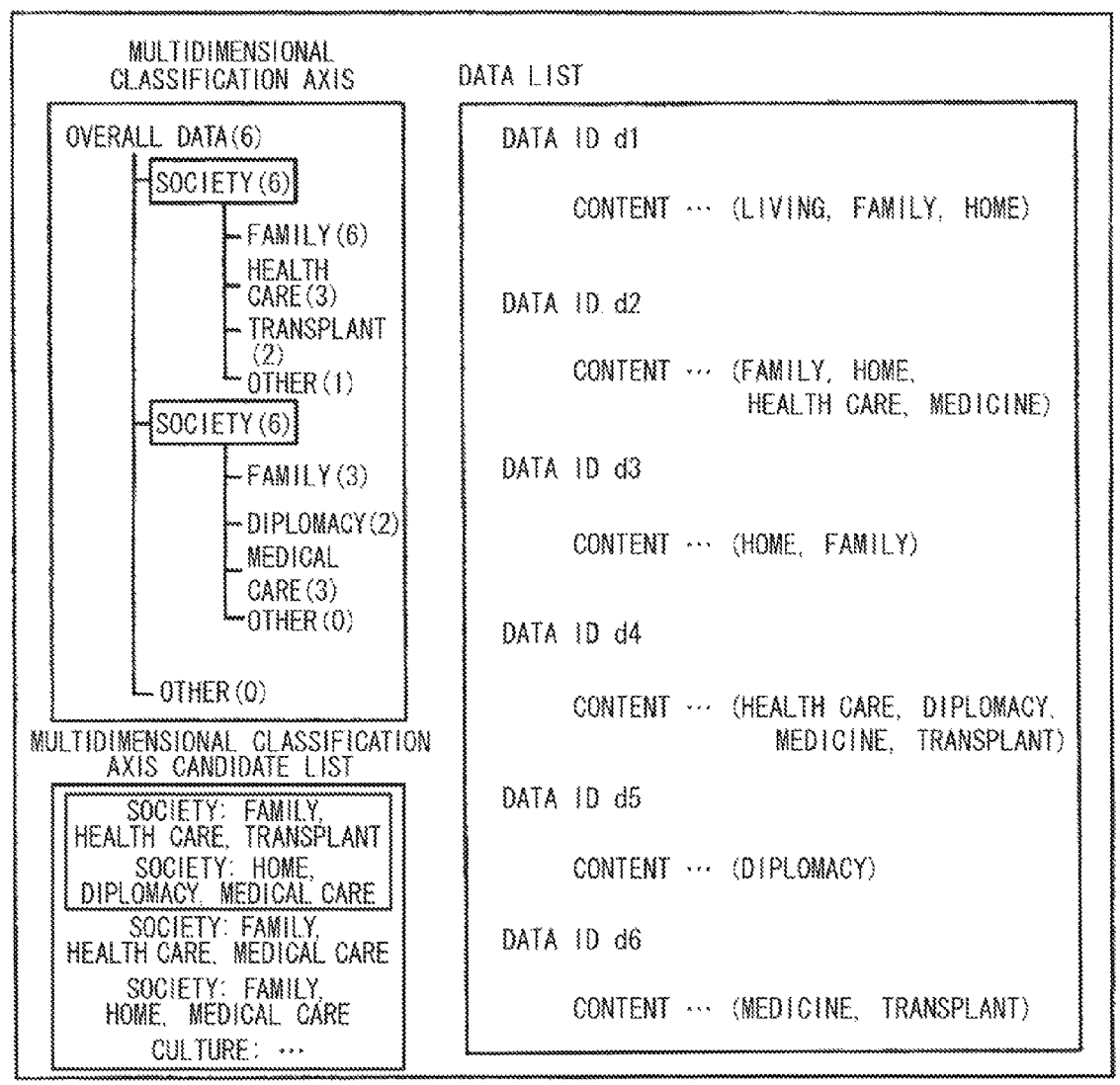
FIG. 25 An illustration showing an example of information which a multidimensional display means displays in list form.

First, the operation of the multidimensional display means 1051 for displaying information in a list form will be described. FIG. 25 shows an example of information which the multidimensional display means 1051 displays in a list form. As shown in FIG. 25, the multidimensional display means 1051 displays a screen image including areas for displaying a multidimensional classification axis, a multidimensional classification axis candidate list and a data list. As the multidimensional classification axis, the multidimensional display means 1051 displays a multidimensional classification axis having the highest priority or a classification axis selected from the multidimensional classification axis candidate list. In addition, the multidimensional display means 1051 displays basic categories and classifications in each dimension, each of which is followed by the amount of data.

FIG. 25 shows an example of a multidimensional classification axis (society: family, health care, transplant)–(society: home, diplomacy, medical care). In this case, the multidimensional display means 1051 obtains (extracts) the amount of data correlated to each classification from the data accumulation unit 203 so as to display it.

In an example of FIG. 25, a column representing an item of "other" is newly added to the screen image displayed on the multidimensional display means 1051. Herein, the column of "other" below "society" is correlated to the basic category of "society", wherein it is used to classify data which are not correlated to classifications on each classification axis. The column of "other" serving as a child descendant from all data is used to describe classifications irrelevant to all classification axes. In this connection, the multidimensional display means 1051 is able to obtain the amount of data ascribed to the column of "other" with reference to the information stored in the data accumulation unit 203. As the amount of data, the present embodiment embraces the amount of data correlated to descendant classifications.

In an example of FIG. 25, the multidimensional display means 1051 displays classification axes whose priorities have been calculated in the multidimensional classification axis candidate list in an order of priorities. The multidimensional display means 1051 is able to obtain multidimensional classification axes based on the calculation result of the secondary multidimensional index calculation means 1033.

In examples shown in FIGS. 20(A), 20(B) and 20(C), the multidimensional display means 1051 displays a list of data in a data list. In this case, the multidimensional display means 1051 displays data in connection with data IDs, contents and classifications. In this connection, the multidimensional display means 1051 is able to obtain these pieces of information with reference to the information stored in the data accumulation unit 203.

In the present embodiment, the functions of the constituent elements other than the multidimensional display means 1051 are equivalent to the functions of the counterpart constituent elements described in the fifth embodiment.

Next, the operation of the multidimensional display means 1051 for displaying information in a list form will be described. As an initial rendition, the multidimensional display means 1051 displays a multidimensional classification axis having the highest priority in an area of displaying the multidimensional classification axis. In addition, the multidimensional display means 1051 displays other candidates of multidimensional classification axes in the multidimensional classification axis candidate list in an order of priorities. Furthermore, the multidimensional display mans 1051 displays all the data accumulated in the data accumulation unit 203 in the data list.

The multidimensional display means 1051 selects one or plural classifications of each dimension on the multidimensional classification axis, which is displayed in an area of displaying the multidimensional classification axis, thus displaying only the data correlated to all the selected classifications in the data list.

Next, when any one of classification axes on each multidimensional classification axis, which is displayed in an area of displaying the multidimensional classification axis candidate list, is selected upon the user's operation, the multidimensional display means 1051 replaces the displayed content of the multidimensional classification axis with the content of the selected multidimensional classification axis.

Although the present embodiment refers to two-dimensional classification axes, the multidimensional display means 1051 is able to display multidimensional classification axes each ascribed to three or higher dimensions in accordance with the similar process. In this case, the multidimensional display means 1051 displays the data list by adding three or higher dimensional classification axes to the area of displaying the multidimensional classification axis.

Figure 26:
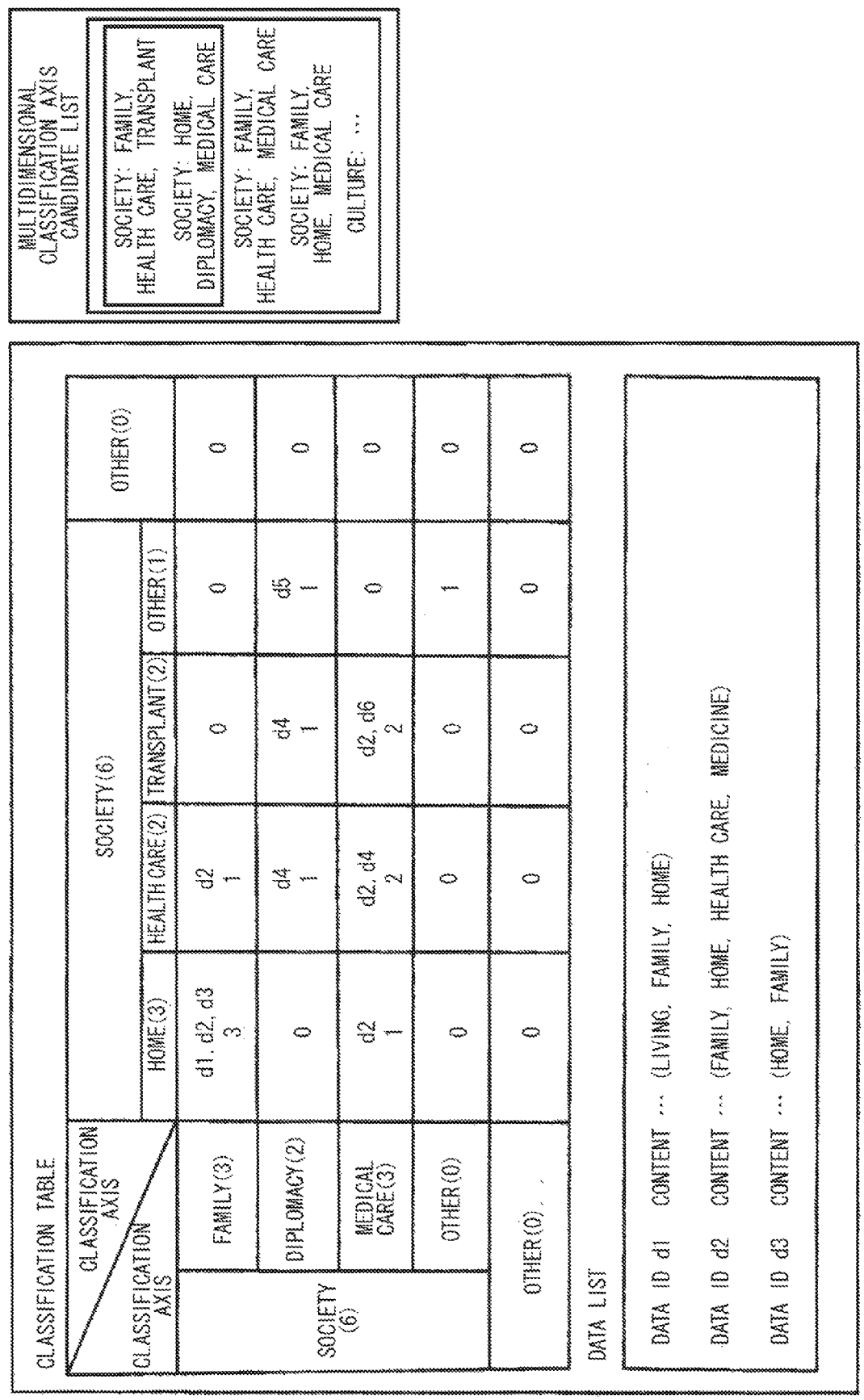
FIG. 26 An illustration showing an example of information which the multidimensional display means displays in table form.

Next, the operation of the multidimensional display means 1051 for displaying information in a table form will be described. FIG. 26 shows an example of information which the multidimensional display means 1051 displays in a table form. As shown in FIG. 26, the multidimensional display means 1051 displays a screen image including areas of displaying a multidimensional classification table, a data list and a multidimensional classification axis candidate list.

By use of a multidimensional classification axis having the highest priority among multidimensional classification axis candidates, the multidimensional display means 1051 displays the multidimensional classification table in which the horizontal axis represents first-dimensional information whilst the vertical axis represents second-dimensional information. In the case of the multidimensional classification table ascribed to three or higher dimensions, the multidimensional display means 1051 additionally displays s a further dimension of information on the vertical axis and/or the horizontal axis. In the case of a multidimensional classification ascribed to three dimensions, for example, the multidimensional display means 1051 displays first-dimensional information on the horizontal axis, adjacently disposes third-dimensional information, and displays second-dimensional information on the vertical axis. In addition, the multidimensional display means 1051 displays information representative of what kind of data exists in each cell of each table. In the present embodiment, the multidimensional display means 1051 displays data IDs and their numbers.

When any one of cells is selected from the multidimensional classification table upon the user's operation, the multidimensional display means 1051 displays a data list corresponding to the selected cell. In the present embodiment, the multidimensional display means 1051 displays data IDs, contents and classifications. In this connection, the multidimensional display means 1051 displays these pieces of information with reference to the information stored in the data accumulation unit 203.

The multidimensional display means 1051 displays multidimensional classification axes whose priorities have been calculated in the multidimensional classification axis candidate list in an order of priorities. The multidimensional display means 1051 is able to obtain these pieces of information based on the calculation result of the secondary multidimensional index calculation means 1032.

Next, the operation of the multidimensional display means 1051 for displaying information in a table form will be described. In an initial rendition, the multidimensional display means 1051 displays a multidimensional classification axis having the highest priority in the multidimensional classification table. In this case, the multidimensional display means 1051 displays the horizontal axis and the vertical axis in accordance with the foregoing method. In this connection, the multidimensional display means 1051 has not yet displayed any data in the data list.

Next, when any one of cells is selected from the multidimensional classification table upon the user's operation, the multidimensional display means 1051 displays data corresponding to the selected cell in the data list.

Next, when any one of multidimensional classification axes is selected from the multidimensional classification axis candidate list upon the user's operation, the multidimensional display means 1051 displays selected axes in the multidimensional classification table.

According to the present embodiment described above, multidimensional classification axes, priority and data, which are produced by the secondary multidimensional index calculation means 1033, are displayed in a list form or in a table form. This allows users to visually recognize the selected status of each multidimensional classification axis, priority and data.

Ninth Embodiment

Figure 27:
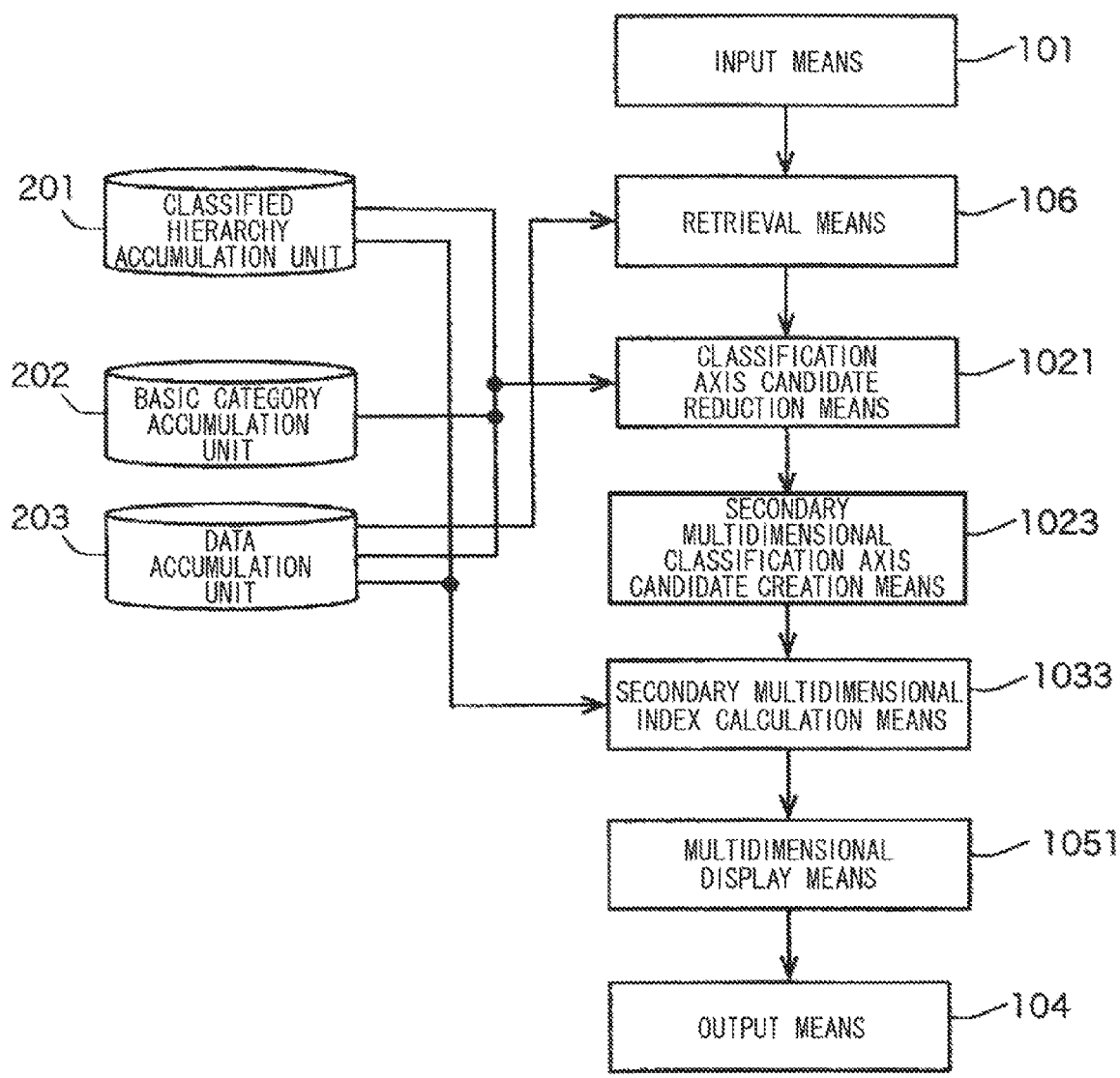
FIG. 27 A block diagram showing an example of the constitution of a data classifier system according to a ninth embodiment.

Next, a ninth embodiment of the present invention will be described. FIG. 27 is a block diagram showing an example of the constitution of a data classifier system according to the ninth embodiment. As shown in FIG. 27, the present embodiment differs from the eighth embodiment in that the data classifier system further includes a retrieval means 106 in addition to the constituent elements shown in FIG. 24.

Specifically, the retrieval means 106 is configured of a CPU of an information processing device which operates according to programs. The retrieval means 106 implements functions of receiving (inputting) retrieval keywords and classifications and retrieving the stored contents of the data accumulation unit 203 and other attribute information. In addition, the retrieval means 106 implements functions of obtaining (extracting) retrieval-resultant data IDs and transferring (outputting) them to the classification axis candidate reduction means 1021. Upon executing a retrieval process, the retrieval means 106 retrieves contents and attribute information by use of an existing full-text retrieval engine or a relational data base technique.

The present embodiment differs from the eighth embodiment in that the data classifier system performs processing on a database selecting retrieval-resultant data IDs from the data accumulation unit 203. Other procedures executed by the data classifier system are equivalent to those described in the eighth embodiment.

In the present embodiment, the data classifier system can be modified to perform processing using the multidimensional classification axis creation means 1022 instead of the classification axis candidate reduction means 1021 and the secondary multidimensional classification axis creation means 1023. In addition, the present embodiment can be modified to perform processing using the multidimensional index calculation means 1032 instead of the secondary multidimensional index calculation means 1033. Furthermore, the data classifier system does not need to include the secondary multidimensional classification axis creation means 1023 but can perform processing using the index calculation means 103 or the secondary index calculation means 1031 instead of the secondary multidimensional index calculation means 1033. Moreover, the data classifier system can be modified to perform processing using the display means 105 instead of the multidimensional display means 1051.

According to the above constitution, it is possible to display multidimensional classification axes or classification axes based on the user's retrieval result alone.

As described above, the present embodiment retrieves the stored contents of the data accumulation unit 203 and other attribute information, thus reducing classification axis candidates with respect to the retrieved information alone. Therefore, upon receiving the classified hierarchy and data groups correlated to classifications, it is possible to efficiently determine priorities of classification axes in light of independences.

Tenth Embodiment

Figure 28:
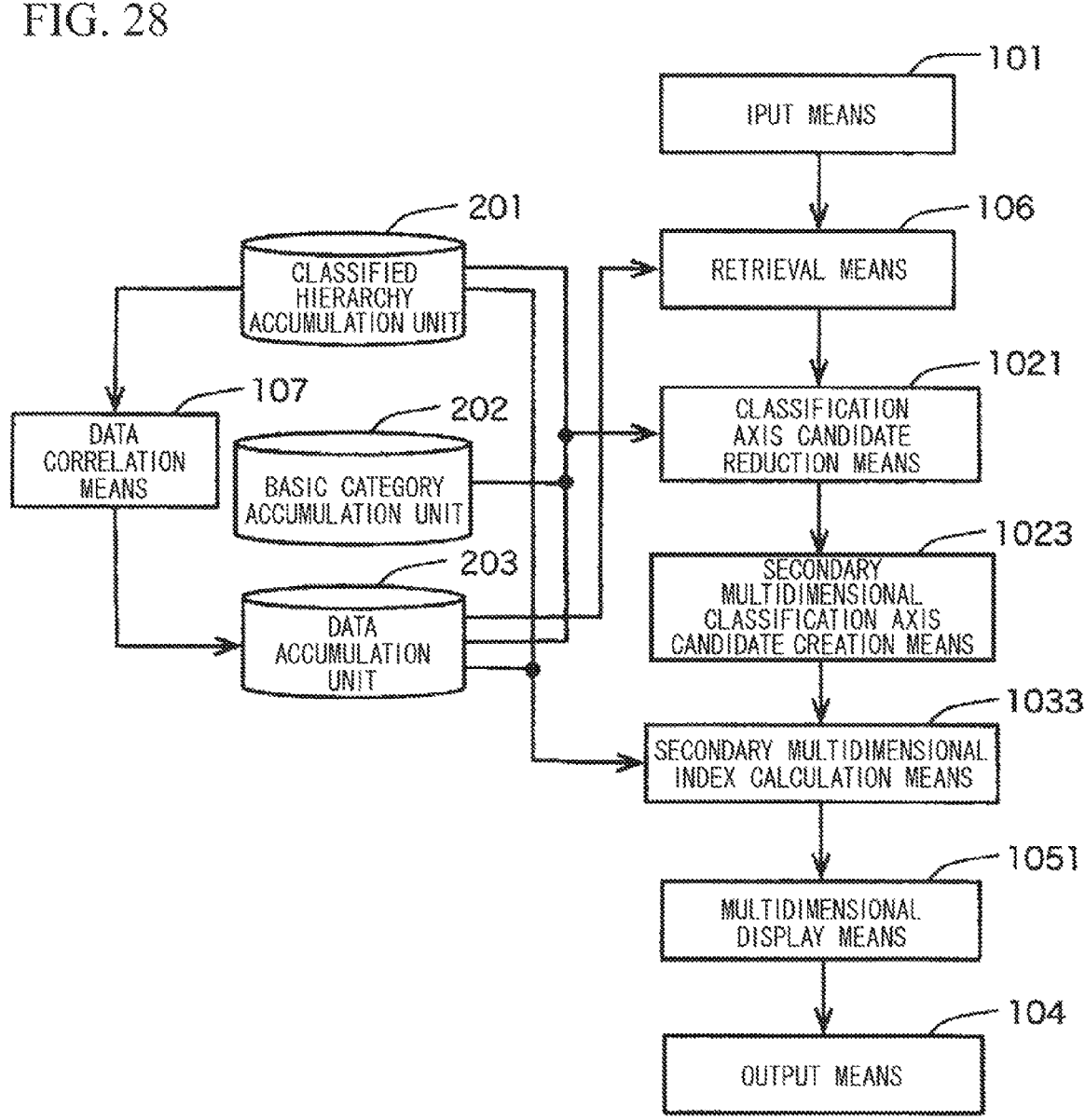
FIG. 28 A block diagram showing an example of the constitution of a data classifier system according to a tenth embodiment.

Next, a tenth embodiment of the present invention will be described. FIG. 28 is a block diagram showing an example of the constitution of a data classifier system according to the tenth embodiment. As shown in FIG. 28, the present embodiment differs from the ninth embodiment in that the data classifier system further includes a data correlation means 107 in addition to the foregoing constituent elements shown in FIG. 27.

Specifically, the data correlation means 107 is configured of a CPU of an information processing device which operates according to programs. The data correlation means 107 implements a function of correlating data and classifications with reference to the information stored in the classified hierarchy accumulation unit 201 and the information stored in the data accumulation unit 203. As a correlation method, the data correlation means 107 employs existing methods such as a method of detecting the occurrence of data representative of classification names in contents and a method of measuring cosine similarity between data representative of classification names and contents, thus making correlations.

In this connection, it is preferable that the data correlation means 107 make correlations before the secondary multidimensional classification axis candidate creation means 1023 creates classification axis candidates.

The data classifier system of the present embodiment can be modified to perform processing using the multidimensional classification axis candidate creation means 1022 instead of the classification axis candidate reduction means 1021 and the secondary multidimensional classification axis candidate creation means 1023. In addition, the data classifier system can be modified to perform processing using the multidimensional index calculation means 1032 instead of the secondary multidimensional index calculation means 1033. Furthermore, the data classifier system does not necessarily include the secondary multidimensional classification axis candidate creation means 1023 but can perform processing using the index calculation means 103 or the secondary index calculation means 1031 instead of the secondary multidimensional index calculation means 1033. Moreover, the data classifier system can be modified to perform processing using the display means 105 instead of the multidimensional display means 1051.

As described above, the present embodiment makes correlations between data and classifications with reference to the information stored in the classified hierarchy accumulation means 201 and the information stored in the data accumulation means 203, thus reducing the number of classification axis candidates. Therefore, upon receiving the classified hierarchy and data groups correlated to classifications, it is possible to determine priorities of classification axis candidates precisely considering independences.

Figure 29:
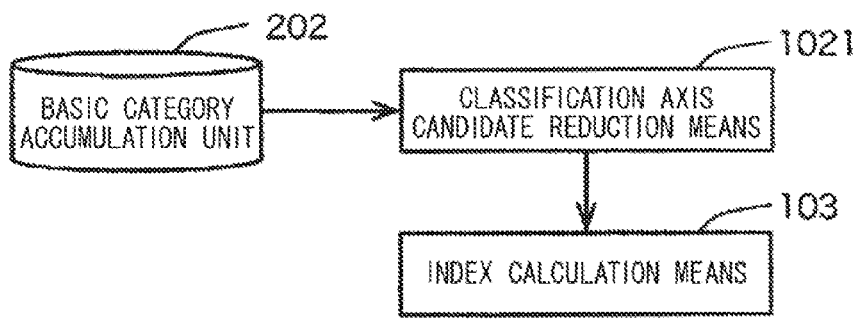
FIG. 29 A block diagram showing an example of a minimum constitution of a data classifier system.

Next, the minimum constitution of the data classifier system will be described. FIG. 29 is a block diagram showing the minimum constitution of the data classifier system. As shown in FIG. 29, the data classifier system includes a set of minimum constituent elements, i.e. the basic category accumulation unit 202, the classification axis candidate creation means 102 and the index calculation means 103.

The basic category accumulation unit 202 accumulates classifications serving as basic categories, which are used for selecting classifications, in advance. In addition, the classification axis candidate creation means 102 has a function of creating classification axis candidates based on combinations of classifications each correlated to at least one data among descendant classifications of each basic category. The index calculation means 103 has a function of calculating priorities of classification axis candidates, which are created by the classification axis candidate creation means based on hierarchical distances of classifications in the classified hierarchy.

In the data classifier system having the minimum constitution shown in FIG. 29, the priority calculation means determines priorities of classification axis candidates considering independences based on hierarchical distances of classifications. For this reason, even when the classified hierarchy includes similar classifications, it is possible to provide users with user-comprehensible classification axes.

The aforementioned embodiments illustrate the following constitutional features (1) through (16) adapted to data classifier systems.

(1) The data classifier system is a system which selects a plurality of classifications correlated to data groups so as to output classification axes based on hierarchal classifications and data groups. The data classifier system includes a basic category accumulation means (e.g. the basic category accumulation unit 202) which accumulates classifications serving as basic categories used for selecting desired classifications in advance, a classification axis candidate creation means (e.g. the classification axis candidate creation means 102) which creates classification axis candidates based on combinations of classifications each corresponding to at least one data among descendant classifications of each basic category, and a priority calculation means (e.g. the index calculation means 103) which calculates priority in displaying classification axis candidates reduced by the classification axis candidate reduction means.

(2) In the data classifier system, the priority calculation means is configured to change priorities based on hierarchical distances of classifications, i.e. lengths leading to the common ancestor among classifications in the classified hierarchy.

(3) In the data classifier system, the priority calculation means is configured to calculate hierarchical distances of classifications in the classified hierarchy and determine priorities of classification axis candidates based on at least one of depths, of classifications in the classified hierarchy, data quantities of classifications and data redundancies of classifications.

(4) In the data classifier system, the classification axis candidate creation means is configured to reduce the number of classification axis candidates subjected to calculations based on data quantities of classifications and hierarchical distances of classifications in the classified hierarchy.

(5) In the data classifier system, the classification axis candidate creation means is configured to select classification axes, satisfying a condition that data quantities of classifications are each larger than a predetermined value or fall within an upper range in a descending order of data quantities and a condition that lengths of classifications leading to the common ancestor fall within a specific range.

(6) The data classifier system includes, a display control means (e.g. the display means 105) which inputs classification axis candidates reduced by the classification axis candidate reduction means and priority calculated by the priority calculation means so as to perform display control on data groups. The display control means displays classification axis candidates in an order of priorities, wherein displayed classification axes are changed in response to selected classification axis candidates, and wherein data groups are selected or reduced in response to selected classifications on each classification axis.

(7) The data classifier system includes a data retrieval means (e.g. the retrieval means 106) which retrieves data groups based on retrieval keywords so as to output retrieval-resultant data groups to the classification axis candidate creation means. The classification axis candidate creation means creates classification axis candidates based on the retrieval result of the data retrieval means, so that the priority calculation means calculates priorities of classification axes correlated to data groups retrieved by the data retrieval means.

(8) The data classifier system includes a data correlation means (e.g. the data correlation means 107) which inputs hierarchical classifications and data groups so as to correlate input classifications and data groups.

(9) The data classifier system is a system which creates a plurality of classifications correlated to data groups based on hierarchical classifications and correspondent data groups so as to output a plurality of combinations of classification axes. The data classifier system includes a basic category accumulation means (e.g. the basic category accumulation unit 202) which accumulates classifications serving as basic categories, which are used to select classifications, a multidimensional classification axis candidate creation means (e.g. the multidimensional classification axis candidate creation means 1022) which creates classification axis candidates based on combinations of classifications each correlated to at least one data among descendant classifications of each basic category so as to create multidimensional classification axis candidates combining a plurality of classification axis candidates, and a multidimensional priority calculation means (e.g. the multidimensional index calculation means 1032) which calculates priorities of multidimensional classification axis candidates which are created by the multidimensional classification axis candidate creation means based on hierarchical distances of classifications in the classified hierarchy.

(10) In the data classifier system, the multidimensional priority calculation means is configured to change priorities of multidimensional classification axes based on hierarchical distances of classifications in the classified hierarchy, i.e. lengths of classifications leading to the common ancestor in the classified hierarchy.

(11) In the data classifier system, the multidimensional priority calculation means is configured to calculate hierarchical distances of classifications allocated to classification axes of each dimension in the classified hierarchy and determine priorities of multidimensional classification axis candidates based on at least one of depths of classifications allocated to classification axes of each dimension in the classified hierarchy, data quantities of classifications and data redundancies of classifications.

(12) In the data classifier system, the multidimensional classification axis creation means is configured to reduce the number of multidimensional classification axis candidates subjected to calculations based on data quantities of classifications allocated to classification axes of each dimension and hierarchical distances of classification allocated to classification axes of each dimension.

(13) In the data classifier system, the multidimensional classification axis candidate creation means is configured to select multidimensional classification axes including classifications in which data quantities of classifications allocated to classification axes of each dimension are larger than a predetermined value or fall within an upper range in a descending order of data quantities and in which hierarchical distances of classifications allocated to classification axes of each dimension, i.e. lengths of classifications leading to the common ancestor, fall within a specific range.

(14) The data classifier system includes a multidimensional display control means (e.g. the multidimensional display means 1051) which inputs multidimensional classification axis candidates reduced by the classification axis candidate reduction means and priority calculated by the multidimensional priority calculation means so as to perform display control on data groups in a list form or in a table form. The multidimensional display control means selects multidimensional classification axis candidates so as to display classifications ascribed to each dimension in a list form or in a table form, whereby it displays at least one of data quantity, data names, data attributes and characteristic words corresponding to one or plural classifications which are selected.

(15) The data classifier system includes a data retrieval means (e.g. the retrieval means 106) which allows users to retrieve data groups based on retrieval keywords and which outputs retrieval-resultant data groups to the multidimensional classification axis candidate reduction means.

(16) The data classifier system includes a data correlation means (e.g. the data correlation means 107) which inputs hierarchical classifications and data groups so as to correlate input classifications and data groups.

The present invention is not necessarily limited to the aforementioned embodiments, which can be adequately changed or modified within a range not deviating from the scope of the present invention.

INDUSTRIAL APPLICABILITY

The present invention is applicable to document classifier devices facilitating outline comprehension of numerous documents and programs realizing document classifier devices. In addition, the present invention is applicable to classified display devices classifying and displaying numerous images and programs realizing classified display devices.

DESCRIPTION OF THE REFERENCE NUMERALS

101 Input means
102 Classification axis candidate creation means
103 Index calculation means
104 Output means
105 Display means
106 Retrieval means
107 Data correlation means
201 Classified hierarchy accumulation unit
202 Basic category accumulation unit
203 Data accumulation unit
1021 Classification axis candidate reduction means
1022 Multidimensional classification axis candidate creation means
1023 Secondary multidimensional classification axis candidate creation means
1031 Secondary index calculation means
1032 Multidimensional index calculation means
1033 Secondary multidimensional index calculation means
1051 Multidimensional display means

The invention claimed is:

1. A data classifier system, implemented by a computer including a processor and a storage device, which refers to a classified hierarchy including a plurality of classifications to produce a plurality of classification axes based on classifications and data groups input, wherein the storage device stores the classified hierarchy establishing a parent-child relationship between the plurality of classifications and classifications serving as basic categories which are used to select desired classifications;

wherein the processor creates classification axis candidates based on combinations of classifications belonging to basic categories;

wherein the processor inputs the classification axis candidates to calculate priorities with respect to the classification axis candidates with reference to hierarchical distances, each representing a length of a path reaching a common ancestor among classifications associated with the classification axis candidates, and hierarchical depths, each representing a length of a path between classifications associated with the classification axis candidates, and wherein semantic independence of each of the plurality of classification axes is based on length of hierarchical distances of each of the plurality of classification axes, wherein the priority concerning a basic category X related to a plurality of classifications C in the classified hierarchy is calculated using a formula:

$$\text{Priority}(X{:}C)=W1\times\text{Independence}(X{:}C)+W2\times\text{Specifics}(X{:}C)+W3\times\text{Exhaustivity}(X{:}C)+W4\times\text{Uniqueness}(X{:}C),$$

wherein W1, W2, W3 and W4 denote weight coefficients to indexes which are determined in advance, wherein the Exhaustivity(X:C) is given using a formula:

$$\text{Exhaustivity}(X{:}C)=1/\text{DataNum}\times|U\,\text{Data}(ci)|,$$

wherein DataNum denotes an amount of data being classified, wherein Data(ci) denotes a set of data allocated to a classification ci selected from among the plurality of classifications, and wherein |U Data (ci)| denotes an amount of data allocated to the plurality of classifications.

2. The data classifier system according to claim 1, wherein the processor determines the priorities of the classification axis candidates based on at least one of the lengths of the paths reaching the common ancestor in the classified hierarchy, data quantities, each representing a number of subclassifications descendant from each classification, and data redundancies each representing a redundancy of classifications assigned to each classification axis.

3. The data classifier system according to claim 2, wherein each of the data quantities indicates one of (a) coverage and (b) exhaustivity relating to the plurality of classifications assigned to each classification axis, and wherein the processor increases the priority as the coverage increases.

4. The data classifier system according to claim 2, wherein the processor reduces the priority as the data redundancy increases.

5. The data classifier system according to claim 1, wherein the processor reduces a number of classification axis candidates based on data quantities of classifications and hierarchical distances among classifications in the classified hierarchy.

6. The data classifier system according to claim 1, wherein the processor selects classification axes with data quantities of classifications which are larger than a predetermined value or within an upper range in a descending order of data quantities, and within a specific range of hierarchical distances.

7. The data classifier system according to claim 1, wherein the processor displays the classification axis candidates and the priorities in association with data groups, and wherein the processor displays the classification axis candidates in an order of the priorities, selects the classification axis candidates to change and display classification axes, and selects classifications in the classification axes to limit data groups.

8. The data classifier system according to claim 1, wherein the processor retrieves data groups based on retrieval keywords, creates classification axis candidates based on the retrieved data groups, and calculates priorities of classification axes correlated to the retrieved data groups.

9. The data classifier system according to claim 1, wherein the processor establishes correlation between the classifications and the data groups input.

10. The data classifier system according to claim 1, wherein the priority concerning a basic category X related to a plurality of classifications C in the classified hierarchy is calculated using a formula:

$$\text{Priority}(X{:}C)=1/\text{Max}(X)\times 1/(2\times N)\times\Sigma\text{ComDist}(ci,cj),$$

wherein Max(X) denotes a depth of a deepest classification among classifications descending from the basic category X, N denotes a number of the plurality of classifications, and ComDist(ci,cj) denotes a distance between classifications ci and cj selected from among the plurality of classifications.

11. The data classifier system according to claim 1, wherein the Independent(X:C) is given using a formula:

$$\text{Independence}(X{:}C)=1/\text{Max}(X)\times 1/(2\times N)\times\Sigma\text{ComDist}(ci,cj),$$

wherein Max(X) denotes a depth of a deepest classification among classifications descending from the basic category X, N denotes a number of the plurality of classifications, and ComDist(ci,cj) denotes a distance between classifications ci and cj selected from among the plurality of classifications.

12. The data classifier system according to claim 1, wherein the Specifics(X:C) is given using a formula:

$$\text{Specifics}(X{:}C)=1/\text{Max}(X)\times 1/N\times\Sigma\text{Depth}(X,ci),$$

wherein Max(X) denotes a depth of a deepest classification among classifications descending from the basic category, N denotes a number of the plurality of classifications, and Depth(X,ci) denotes a shortest path length from the basic category X to a classification ci selected from among the plurality of classifications.

13. A data classifier system, implemented by a computer including a processor and a storage device, which refers to a classified hierarchy including a plurality of classifications to create a plurality of classification axes based on classifications and data groups input, wherein the storage device stores a classified hierarchy establishing a parent-child relationship between the plurality of classifications and classifications serving as basic categories which are used to select desired classifications;

wherein the processor creates classification axis candidates based on combinations of classifications belonging to each basic category to produce multidimensional classification axis candidates each combining a plurality of classification axis candidates;

wherein the processor inputs the classification axis candidates to calculate-priorities with respect to the multidimensional classification axis candidates with reference to hierarchical distances, each representing a length of a path reaching a common ancestor among classifications associated with classification axis candidates and hierarchical depths each representing a length of a path between classifications associated with classification axis candidates, and wherein semantic independence of each of the plurality of classification axes is based on length of hierarchical distances of each of the plurality of classification axes, wherein the priority concerning a basic category X related to a plurality of classifications C in the classified hierarchy is calculated using a formula:

$$\text{Priority}(X{:}C)=W1\times\text{Independence}(X{:}C)+W2\times\text{Specifics}(X{:}C)+W3\times\text{Exhaustivity}(X{:}C)+W4\times\text{Uniqueness}(X{:}C),$$

wherein W1, W2, W3 and W4 denote weight coefficients to indexes which are determined in advance, wherein the Uniqueness(X:C) is given using a formula:

$$\text{Uniqueness}(X{:}C)=1/(1/|U\text{ Data}(ci)|\times\Sigma\text{CatNum}(ci)),$$

wherein Data(ci) denotes a set of data allocated to a classification ci selected from among the plurality of classifications, wherein |U Data (ci)| denotes an amount of data having no redundancy allocated to each of the plurality of classifications, and wherein CatNum(ci) denotes an amount of data allocated to the classification ci.

14. The data classifier system according to claim 13, wherein the processor determines the priorities of the multidimensional classification axis candidates based on at least one of the lengths of the paths reaching the common ancestor among classifications in the classified hierarchy, data quantities, each representing a number of subclassifications descendant from each classification, and data redundancies each representing a redundancy between classifications assigned to each classification axis.

15. The data classifier system according to claim 14, wherein each of the data quantities indicates one of (a) coverage and (b) exhaustivity relating to the plurality of classifications assigned to each classification axis, and wherein the processor increases the priority as the coverage increases.

16. The data classifier system according to claim 14, wherein the processor reduces the priority as the data redundancy increases.

17. The data classifier system according to claim 13, wherein the processor reduces a number of multidimensional classification axis candidates based on data quantities of classifications of classification axes for each dimension and hierarchical distances between classifications of classification axes for each dimension.

18. The data classifier system according to claim 13, wherein the processor selects multidimensional classification axes including classifications with data quantities of classifications of classification axes for each dimension which are larger than a predetermined value or within an upper range in a descending order of data quantities, and classifications within a specific range of hierarchical distances among classifications of classification axes for each dimension.

19. The data classifier system according to claim 13,
wherein the processor displays the multidimensional classification axis candidates and the priorities in association with data groups in a list form or in a table form; and
wherein the processor selects the multidimensional classification axis candidates to display and allocate classifications for each dimension to the list form or the table form, and subsequently selects one or plural classifications to display at least one of data quantities, data names, data attributes and characteristic terms with respect to the selected classifications.

20. The data classifier system according to claim 13, wherein the processor retrieves data groups based on retrieval keywords to output retrieved data groups.

21. The data classifier system according to claim 13, wherein the processor establishes correlation between the classifications and the data groups input.

22. The data classifier system according to claim 13, wherein the processor calculates the priority by dividing an average value of the hierarchical distances, among classifications in the classified hierarchy, by the hierarchical depth.

23. A data classifier method, implemented by a computer including a processor and a memory, which refers to a classified hierarchy including a plurality of classifications to produce a plurality of classification axes based on classifications and data groups input,
wherein the memory stores the classified hierarchy establishing a parent-child relationship between the plurality of classifications and classifications serving as basic categories which are used to select desired classifications;
wherein the processor creates classification axis candidates based on combinations of classifications belonging to each basic category;
wherein the processor inputs the classification axis candidates to calculate priorities with respect to the classification axis candidates with reference to hierarchical distances, each representing a length of a path reaching a common ancestor among classifications associated with classification axis candidates, and hierarchical depths each representing a length of a path between classifications associated with the classification axis candidates, and
wherein semantic independence of each of the plurality of classification axes is based on length of hierarchical distances of each of the plurality of classification axes,
wherein the processor calculates the priority concerning a basic category X related to a plurality of classifications C in the classified hierarchy using a formula:

$$\text{Priority}(X{:}C)=W1\times\text{Independence}(X{:}C)+W2\times\text{Specifics}(X{:}C)+W3\times\text{Exhaustivity}(X{:}C)+W4\times\text{Uniqueness}(X{:}C),$$

wherein W1, W2, W3 and W4 denote weight coefficients to indexes which are determined in advance, wherein the Exhaustivity(X:C) is given using a formula:

$$\text{Exhaustivity}(X{:}C)=1/\text{DataNum}\times|U\text{ Data}(ci)|,$$

wherein DataNum denotes an amount of data being classified, wherein Data(ci) denotes a set of data allocated to a classification ci selected from among the plurality of classifications, and wherein |U Data (ci)| denotes an amount of data allocated to the plurality of classifications.

24. The data classifier method according to claim 23, wherein the processor determines the priorities of the classification axis candidates based on at least one of the hierarchical distances between classifications in the classified hierarchy, data quantities, representing a number of subclassifications descendant from each classification, and data redundancies each representing a redundancy of classifications assigned to each classification axis.

25. A data classifier method, implemented by a computer including a processor and a memory, which refers to a classified hierarchy including a plurality of classifications to produce a plurality of classification axes based on classifications and data groups input,
wherein the memory stores the classified hierarchy establishing a parent-child relationship between the plurality of classifications and classifications serving as basic categories which are used to select desired classifications, wherein the processor creates classification axis candidates based on combinations of classifications belonging to each basic category, to produce multidimensional classification axis candidates each combining a plurality of classification axis candidates;

wherein the processor inputs the multidimensional classification axis candidates to calculate priorities with respect to the multidimensional classification axis candidates with reference to the hierarchical distances, each representing a length of a path reaching a common ancestor among classifications associated with classification axis candidates, and hierarchical depths each representing a length of a path between classifications associated with classification axis candidates; and wherein semantic independence of each of the plurality of classification axes is based on length of hierarchical distances of each of the plurality of classification axes, wherein the processor calculates the priority concerning a basic category X related to a plurality of classifications C in the classified hierarchy using a formula:

Priority$(X:C)=W1\times$Independence$(X:C)+W2\times$Specifics$(X:C)+W3\times$Exhaustivity$(X:C)+W4\times$Uniqueness$(X:C)$, wherein W1, W2, W3 and W4 denote weight coefficients to indexes which are determined in advance, wherein the Uniqueness(X:C) is given using a formula:

Uniqueness$(X:C)=1/(1/|U\,\text{Data}(ci)|\times\Sigma\text{CatNum}(ci))$, wherein Data(ci) denotes a set of data allocated to a classification ci selected from among the plurality of classifications, wherein |U Data (ci)| denotes an amount of data having no redundancy allocated to each of the plurality of classifications, and wherein CatNum(ci) denotes an amount of data allocated to the classification ci.

26. The data classifier method according to claim 25, wherein the processor determines the priorities of the multidimensional classification axis candidates based on at least one of the hierarchical distances between classifications in the classified hierarchy, data quantities of classifications and data redundancies of classifications.

27. A non-transitory computer-readable storage medium storing a data classifier program, executable by a computer, which refers to a classified hierarchy including a plurality of classifications to produce a plurality of classification axes based on classifications and data groups input, said data classifier program implementing:

a basic category accumulation process which stores the classified hierarchy establishing a parent-child relationship between the plurality of classifications and classifications serving as basic categories which are used to select desired classifications;

a classification axis candidate creation process which creates classification axis candidates based on combinations of classifications belonging to each basic category; and a priority calculation process which inputs the classification axis candidates to calculate priorities with respect to the classification axis candidates with reference to hierarchical distances, each representing a length of a path reaching a common ancestor among classifications associated with the classification axis candidates, and hierarchical depths, each representing a length of a path between classifications associated with the classification axis candidates, wherein semantic independence of each of the plurality of classification axes is based on length of hierarchical distances of each of the plurality of classification axes, wherein the priority calculation process calculates the priority concerning a basic category X related to a plurality of classifications C in the classified hierarchy using a formula:

Priority$(X:C)=W1\times$Independence$(X:C)+W2\times$Specifics$(X:C)+W3\times$Exhaustivity$(X:C)+W4\times$Uniqueness$(X:C)$, wherein W1, W2, W3 and W4 denote weight coefficients to indexes which are determined in advance, wherein the Exhaustivity(X:C) is given using a formula:

Exhaustivity$(X:C)=1/\text{DataNum}\times|U\,\text{Data}(ci)|$, wherein DataNum denotes an amount of data being classified, wherein Data(ci) denotes a set of data allocated to a classification ci selected from among the plurality of classifications, and wherein |U Data (ci)| denotes an amount of data allocated to the plurality of classifications.

28. A non-transitory computer-readable storage medium storing a data classifier program, executable by a computer, which refers to a classified hierarchy including a plurality of classifications to produce a plurality of classification axes based on classifications and data groups input, said data classifier program implementing;

a basic category accumulation process which stores the classified hierarchy establishing a parent-child relationship between the plurality of classifications and classifications serving as basic categories which are used to select desired classifications;

a multidimensional classification axis candidate creation process which creates classification axis candidates based on combinations of classifications belonging to each basic category to produce multidimensional classification axis candidates each combining a plurality of classification axis candidates; and a multidimensional priority calculation process which inputs the multidimensional classification axis candidates to calculate priorities with respect to the multidimensional classification axis candidates with reference to hierarchical distances, each representing a length of a path reaching a common ancestor among classifications associated with the classification axis candidates, and hierarchical depths each representing a length of a path between classifications associated with the classification axis candidates, wherein semantic independence of each of the plurality of classification axes is based on length of hierarchical distances of each of the plurality of classification axes, wherein the multidimensional priority calculation process calculates the priority concerning a basic category X related to a plurality of classifications C in the classified hierarchy using a formula:

Priority$(X:C)=W1\times$Independence$(X:C)+W2\times$Specifics$(X:C)+W3\times$Exhaustivity$(X:C)+W4\times$Uniqueness$(X:C)$, wherein W1, W2, W3 and W4 denote weight coefficients to indexes which are determined in advance, wherein the Uniqueness(X:C) is given using a formula:

Uniqueness$(X:C)=1/(1/|U\,\text{Data}(ci)|\times\Sigma\text{CatNum}(ci))$, wherein Data(ci) denotes a set of data allocated to a classification ci selected from among the plurality of classifications, wherein |U Data (ci)| denotes an amount of data having no redundancy allocated to each of the plurality of classifications, and wherein CatNum(ci) denotes an amount of data allocated to the classification ci.

29. The data classifier system according to claim 1, wherein the processor calculates the priority by dividing an average value of the hierarchical distances, among classifications in the classified hierarchy, by the hierarchical depth.

* * * * *